United States Patent [19]

Fuji

[11] Patent Number: 5,537,381
[45] Date of Patent: Jul. 16, 1996

[54] TEST-WRITING RECORDING CONTROL METHOD AND TEST-WRITING RECORDING CONTROL APPARATUS AND OPTICAL RECORDING MEDIUM

[75] Inventor: Hiroshi Fuji, Soraku-gun, Japan

[73] Assignee: Sharp Kabushiki Kaisha, Osaka, Japan

[21] Appl. No.: 299,848

[22] Filed: Sep. 1, 1994

[30] Foreign Application Priority Data

Sep. 2, 1993 [JP] Japan .................................. 5-218791
Mar. 10, 1994 [JP] Japan .................................. 6-039650

[51] Int. Cl.$^6$ .............................. G11B 7/00; G11B 7/125
[52] U.S. Cl. .............................. 369/116; 369/58; 369/59; 369/54
[58] Field of Search ................................ 369/48, 54, 34, 369/58, 116, 59

[56] References Cited

U.S. PATENT DOCUMENTS

| | | | |
|---|---|---|---|
| 4,873,680 | 10/1989 | Chung et al. | 369/116 |
| 5,185,733 | 2/1993 | Finkelstein et al. | 369/116 |
| 5,226,027 | 7/1993 | Bakx | 369/116 |
| 5,398,227 | 3/1995 | Miyaoka et al. | 369/116 |

FOREIGN PATENT DOCUMENTS 3-102601 4/1991 Japan .
5-266476 10/1993 Japan .

OTHER PUBLICATIONS

Engl. abstract of Fuji+/Sharp App. No. 3-102601-A, pub. Apr. '91.
Engl. abstract of Hajima+/MITS. App. No. 5-266476-A, pub. Oct. '93.

H. Sukeda et al., "High-Speed and High-Density Recording with Stacked Magneto-Optical Disks," J. Magnetics Soc. Japan, vol. 15, Supp. No. S1, pp. 395-398 (1991).

T. Maeda, et al., "Characteristics of Read/Write on Magneto-Optical Disk," Technical Report of Inst. of Electronics, Information & Communications Engineers MR 92-62 Japan (1992).

H. Ide et al., "Study of Mark Edge Recording on Magneto-Optical Disk," Inst. E.I.C.E. Autumn Seminar 1992 (C-0342).

Primary Examiner—Georgia Y. Epps
Assistant Examiner—Kim-Kwok Chu
Attorney, Agent, or Firm—David G. Conlin; Milton Oliver

[57] ABSTRACT

A test-writing recording control method of the present invention forms a first recording pattern consisting of a combination of a first microarea in a first state, which is one of a recording mark or a non-mark section, and a second microarea in a second state, which is the other of the recording mark or the non-mark section and is shorter than a light beam diameter, and a second recording pattern consisting of a combination of a third microarea in the first state, which is longer than the first microarea, and the second microarea, to an optical recording medium by emitting a light beam, and sets a recording condition so that a level difference between reproduced signals corresponding to the first recording pattern and the second recording pattern becomes minimum. This makes it possible to set the recording condition for averaging heat interference in different recording patterns and to accurately record information.

32 Claims, 22 Drawing Sheets

TEST-WRITING RECORDING CONTROL METHOD AND TEST-WRITING RECORDING CONTROL APPARATUS AND OPTICAL RECORDING MEDIUM

FIELD OF THE INVENTION

The present invention relates to an optical recording medium, a test-writing recording control method and a test-writing recording control apparatus for obtaining a recording condition when information is recorded in an optimum state by a light beam.

BACKGROUND OF THE INVENTION

The following are known as conventional arts for obtaining an optimum recording condition with respect to an optical recording medium such as a magneto-optical disk where information is recorded by a light beam.

As the first conventional example, Japanese Laid-Open Patent Application No. 266476/1993 (Tokukaihei 5-266476) discloses an information recording apparatus. This apparatus adopts a method for modulating a power of a semiconductor laser at a power PH of a high level and at a power PL of a low level. The relation between PH and PL is preliminarily determined (PH+αPL=uniform), and a recording power is controlled by feeding back the emitted power of the semiconductor laser.

As the second conventional example, J. Mag. Soc. Jpn., Vol. 15, Supplement No. S1 (1991) discloses a recording control method on PP 395–398. In this method, a edge position of a recording light pulse is controlled for each kind of pulses so that an optimum recording mark is recorded.

However, in the first conventional example, since a semiconductor laser can be controlled so as to have an uniform emitting power but a recording state on the recording medium is not fed back, there exists a problem that actual recording conditions including the recording medium cannot be controlled. Furthermore, in the second conventional example, since the recording mark has a teardrop shape, a reproduced waveform is different in its forward part and its backward part of the mark. Therefore, there arises a problem that accurate data cannot be reproduced.

In order to solve the two problems, a test-writing recording control method is used as the third conventional example. The test-writing recording control method is a method for temporarily recording predetermined data into the magneto-optical disk and reading the recorded data out so as to set an optimum laser power. The test-writing recording control method of the magneto-optical disk which has been disclosed in Technical Report of the Institute of Electronics, Information and Communication Engineers MR 92-62 (1991-11), PP 13–18 or Autumn Meeting Notes of IEICE C-342, PP 5–21 will be explained referring to FIG. 31.

In the above method, first, a recording mark 16 of a shortest mark repeat pattern X and a recording mark 17 of a longest mark repeat pattern Y are recorded to a magneto-optical disk. Then, the recording marks 16 and 17 are read out, and a difference in a voltage $\Delta V$ between an average voltage V1 of a reproduced signal W which corresponds to the shortest mark repeat pattern X and an average voltage V2 of the reproduced signal W which corresponds to the longest mark repeat pattern Y is obtained.

Heat interference between the recording marks 16 and 16, the recording marks 16 and 17, the recording marks 17 and 17 or other recording marks can be almost kept uniform by carrying out the recording while the light beam power being controlled so that the difference in voltage $\Delta V$ becomes 0. Therefore, the more accurate recording can be carried out. The heat interference is an influence given by a heat, which has been generated while recording a certain recording mark, when the next recording mark is recorded.

In addition a laser power Pw changes in proportion to a power Pas of an auxiliary light (Pw=2×Pas), like the first conventional example, a relationship between two power values is preliminarily determined. Moreover, the recording optical pulse is further subdivided and one recording mark is recorded as a lot of recording pulses, thereby preventing the recording mark from having a teardrop shape.

However, the above third art has a first problem that the heat interference is difficult to be accurately kept uniform.

If a length of the marks and a distant between the marks are different, the heat interference becomes different, so the mark having a prescribed size cannot be recorded.

In FIG. 31, the heat interference between the recording marks 16 and 16 of the shortest mark repeat pattern X causes a fluctuation in the level of the reproduced signal W. Since the distance between the longest marks 17 and 17 is long, the heat interference does not cause the fluctuation in the level of the reproduced signal W. Therefore, the average voltage V1 fluctuates due to the heat interference but the average voltage V2 does not fluctuate. In other words, with the arrangement of the third conventional example, it is difficult to exactly know all the heat interference from the difference in voltage $\Delta V$, even if the difference in voltage $\Delta V$ becomes 0, not all the heat interference necessarily becomes uniform. Therefore, the arrangement has a first problem that the heat interference in the shortest mark repeat pattern X can be optimized but the heat interference between the other marks cannot be optimized. In other words, a reproducing duty of the shortest mark repeat pattern X becomes optimum by optimizing the heat interference in the shortest mark repeat pattern X, but the heat interference of the other marks does not become optimum.

In addition, the second problem is as follows. When the relationship between the two values of the laser power is determined, only a one-dimensional power value is adjustable. However, as an ambient temperature or the sensitivity of the recording medium changes, the relationship between the predetermined two values of the laser power (Ph+αPL= constant, or Pw=2×Pas) also changes. As a result, the two-dimensional power value requires adjustment. In other words, since the two values of the laser power are not independently controlled, an adjusting range is narrow and it is difficult to obtain the optimum laser power. This is not limited to the laser power values, and is also applicable to the case where the length and the width of the recording pulse (or interval or period of the pulses) is a recording variable, so there exists a problem that since the position of the edge of the recording pulse is fixed, the length and the width of the recording pulse cannot be independently controlled.

In addition, the third problem is a deterioration in reliability of the test-writing due to repetition of the test-writing. In other words, since the recording information may be destroyed by the test-writing, in order to solve this problem, it is necessary to newly provide an exclusive test-writing area for the test-writing so as to distinguish it from the information recording reproducing area. However, since the test-writing must be carried out every time when the ambient temperature changes or the sensitivity of the recording medium changes due to replacement of the recording medium, etc., it is anticipated that the number of rewriting in the test-writing area increases extremely. For example, if the test-writing is carried once in every three minutes, the rewriting is carried out approximately $10^6$ times in six years. It is expectable that the above number exceeds the guaranteed number of the rewriting on the recording medium, so there arises a problem that the reliability of the test-writing deteriorates.

SUMMARY OF THE INVENTION

It is a first object of the present invention to provide a test-writing recording control method and a test-writing recording control apparatus which is capable of setting an accurate recording condition which is not influenced by a heat interference.

It is a second object of the present invention to provide a test-writing recording control method and a test-writing recording control apparatus which is always capable of independently setting an optimum value to a plurality of variables even when an ambient temperature and recording sensitivity of a recording medium change.

It is a third object of the present invention to provide an optical recording medium which is capable of preventing a deterioration of a reliability of test-writing.

In order to achieve the first object, the test-writing recording control method of the present invention at least includes:

(1) a first step of recording a first recording pattern and a second recording pattern to an optical recording medium by emitting a light beam, the first recording pattern-consisting of a combination of a first microarea in a first state which is one of a recording mark or a non-mark section and a second microarea in a second state which is the other of the recording mark or the non-mark section and is shorter than a light beam diameter, the second recording pattern consisting of a combination of a third microarea in the first state which is longer than the first microarea and the second microarea;

(2) a second step of detecting each level of reproduced signals corresponding to the first recording pattern and the second recording pattern so as to compare; and (3) a third step of setting a recording condition based upon the result of the comparison in the second step.

As the microarea becomes longer with respect to the light beam diameter, detection sensitivity improves more, so the level of reproduced signal becomes higher. Therefore, in the case where the microarea is enough longer than the light beam diameter, the level of the reproduced signal is saturated and a change in the recording and reproducing condition may not occur as a change in the level of the reproduced signal. However, in the present invention, since the first recording pattern and the second recording pattern are formed so that the second microarea is shorter than the light beam diameter, the reproduced signal in the second microarea is not saturated. For this reason, heat interference which is given to the second microarea sensitively causes a fluctuation in the level of the reproduced signal. Therefore, a difference in the heat interference between the first recording pattern and the second recording pattern can be accurately measured by comparing the levels of the reproduced signal of the second microarea in each recording pattern with one another. As a result, the recording condition is set so that the difference in the levels of the reproduced signal becomes minimum. This makes it possible to make the heat interference in different recording patterns uniform. As a result, the accurate recording condition which is not influenced by the heat interference can be set.

Here, in the case where the second microarea is a recording mark, the level of the reproduced signal detected in the second step is a peak level of the reproduced signal in each pattern. Meanwhile, in the case where the second microarea is a non-mark section, the level of the reproduced signal detected in the second step is a bottom level of the reproduced signal in each pattern.

Here, an average level of the reproduced signal corresponding to each pattern is detected in the second step, a difference is obtained by comparing detected each average level and the recording condition is set in the third step so that the difference becomes minimum, thereby making it possible to obtain the similar effect.

In order to achieve the first object, the test-writing recording control apparatus of the present invention at least includes:

(1) recording means for forming a first recording pattern and a second recording pattern to an optical recording medium by emitting a light beam, the first recording pattern consisting of a combination of a first microarea in a first state which is one of a recording mark or a non-mark section and a second microarea in a second state which is the other of the recording mark or the non-mark section and is shorter than a light beam diameter, the second recording pattern consisting of a combination of a third microarea in the first state, which is longer than the first microarea, and the second microarea;

(2) first level detection means for detecting a level from a reproduced signal corresponding to the first recording pattern;

(3) second level detection means for detecting a level from a reproduced signal corresponding to the second recording pattern;

(4) comparison means for calculating a difference between the level detected by the first level detection means and the level detected by the second level detection means; and (5) optimum value determining means for setting a recording condition so that the level difference becomes minimum.

With the above arrangement, the difference in the heat interference between the first recording pattern and the second recording pattern which are formed on the optical recording medium by the recording means shows the difference in the level of the reproduced signal corresponding to the second microarea in each recording pattern. For this reason, the difference in the level is calculated by the first level detection means, the second level detection means and the comparison means, thereby making it possible to accurately measure the difference in the heat interference of each recording pattern. Therefore, the optimum value determining means sets the recording condition so that the level difference becomes minimum. This makes it possible to make the heat interference of different recording patterns uniform. As a result, the accurate recording condition which is not influenced by the heat interference can be set.

In addition, the first level detection means and the second level detection means are composed of envelope detection means for detecting a peak level of the reproduced signal, and the recording condition may be set by the optimum value determining means so that a difference between the detected peak levels becomes minimum.

Furthermore, the comparison means can be composed of a subtracter.

Moreover, the first level detection means and the second level detection means are composed of averaging means for detecting an average level of the reproduced signal corresponding to each recording pattern, and the optimum value determining means sets the recording condition so that a difference between the detected average levels becomes minimum. This also provides the similar effect.

In addition, the first level detection means and the second level detection means are respectively composed of timing generating means and analog/digital converter, and the reproduced signal is converted to a digital signal per peak of the reproduced signal so that the peak level of the reproduced signal is detected. The arrangement that a processor for setting the recording condition so that the difference between the peak levels become minimum is further installed can also ensure the similar effect.

In order to achieve the second object, a test-writing recording control method of the present invention at least includes:

(1) a first step of generating a recording pulse which modulates intensity of a light beam so as to record information to an optical recording medium by emitting the light beam based upon the recording pulse;

(2) a second step of checking a result of reproduction of information recorded in said first step from a viewpoint of the number which is equal to and above the number of variables for determining the recording pulse (3) a third step of obtaining relative relationships between a plurality of variables based upon the above viewpoint; and (4) a fourth step of obtaining an answer to the variables which satisfy all the relative relationships so as to generate a new recording pulse based upon the answer.

With the above arrangement, since the relative relationships between a plurality of variables can be obtained from a viewpoint of the number which is equal to and above the number of variables for determining the recording pulse which modulates the intensity of the light beam, an absolute value of each variable can be determined. Therefore, a plurality of variables can be independently optimized.

The plural variables are two variables which show a power of the light beam, for example, and the relative relationship is a relationship between the variables in the case where the heat interference in different recording patterns becomes uniform and a duty of the reproduced signal becomes optimum, for example.

In such a way, since two relative relationships between the two variables can be obtained, the absolute value of each variable can be determined. This makes it possible to obtain the optimum recording pulse. As a result, information can be accurately recorded under the optimum condition.

In order to achieve the second object, a test-writing recording control apparatus of the present invention at least includes:

(1) recording means for generating a recording pulse which modulates intensity of a light beam so as to form a recording pattern on an optical recording medium by emitting a light beam in accordance with the recording pulse;

(2) relative relationship determining means for obtaining relative relationships between a plurality of variables which determine the recording pulse; and (3) optimizing means for obtaining respective absolute values of said plurality of variables from the relative relationships.

With the above arrangement, since the relative relationships between a plurality of variables can be obtained based upon the same number of viewpoints which is equal to and above the number of variables for determining the recording pulse which modulates the intensity of the light beam, an absolute value of each variable can be determined. Therefore, since a plurality of variables can be independently optimized, the information can be recorded under the optimum condition based upon the optimized recording pulse.

In addition, the relative relationship determining means is composed of simultaneous equations determining means for obtaining simultaneous equations which consists of equations whose number is equal to and above the number of the variables, and the optimizing means can be composed of calculation means for obtaining an answer to the simultaneous equations.

In order to achieve the third object, the optical recording medium of the present invention includes an area for an exclusive use of test-writing.

With the above arrangement, since the area for the test-writing and the area where information is recorded are separated, the information can be prevented from being destroyed by mistake by the test-writing.

Furthermore, with the arrangement that the plural areas for the exclusive use of the test-writing are provided, a number of rewriting by the test-writing can be distributed to the plural areas. This makes it possible to limit the increase in an accumulation number of the test-writing in the recording area of the optical recording medium and to secure the life of the recording area. As a result, a deterioration in the reliability of the test-writing can be prevented.

For a fuller understanding of the nature and advantages of the invention, reference should be made to the ensuing detailed description taken in conjunction with the accompanying drawings.

DESCRIPTION OF THE EMBODIMENTS

FIRST EMBODIMENT

Referring to FIGS. 1 through 5, the following description will discuss the first embodiment of the present invention.

Figure 1:
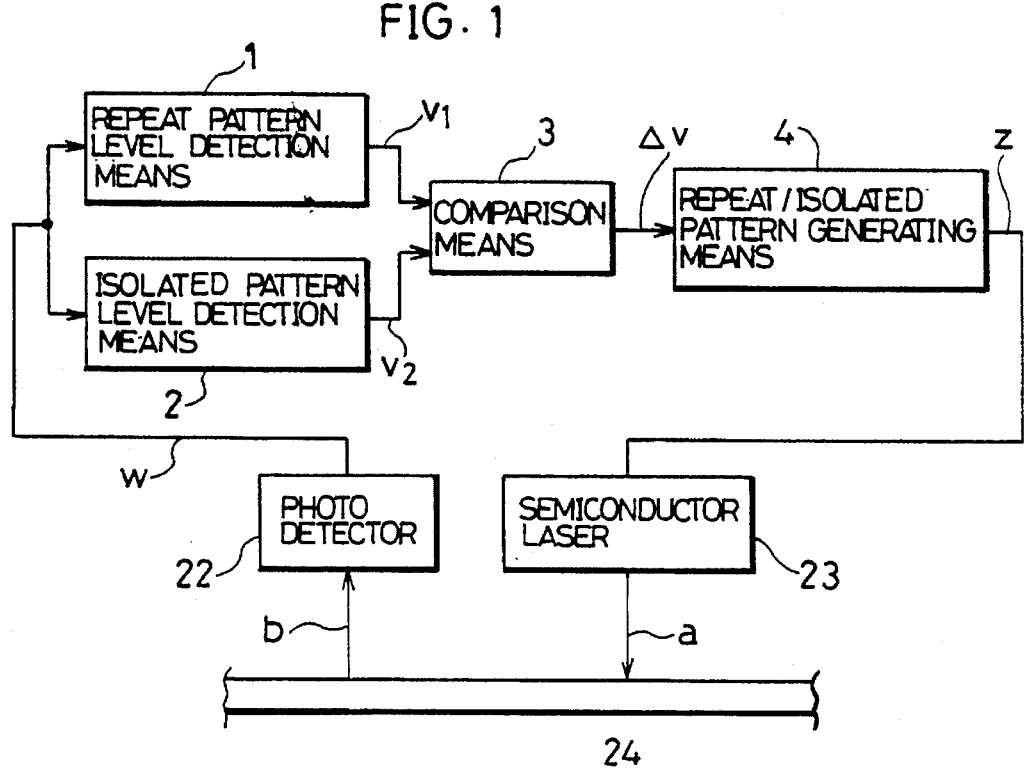
FIG. 1 is a block diagram which shows a basic arrangement of a test-writing recording control apparatus according to one embodiment of the present invention.

As shown in FIG. 1, a test-writing recording control apparatus of the present embodiment includes a semiconductor laser 23 and repeat/isolation pattern generating means 4 for outputting a recording signal z which corresponds to an isolated mark pattern (second recording pattern) and a repeat mark pattern (first recording pattern), to the semiconductor laser 23 so that a level difference $\Delta v$ (mentioned later) become minimum.

Figure 2:
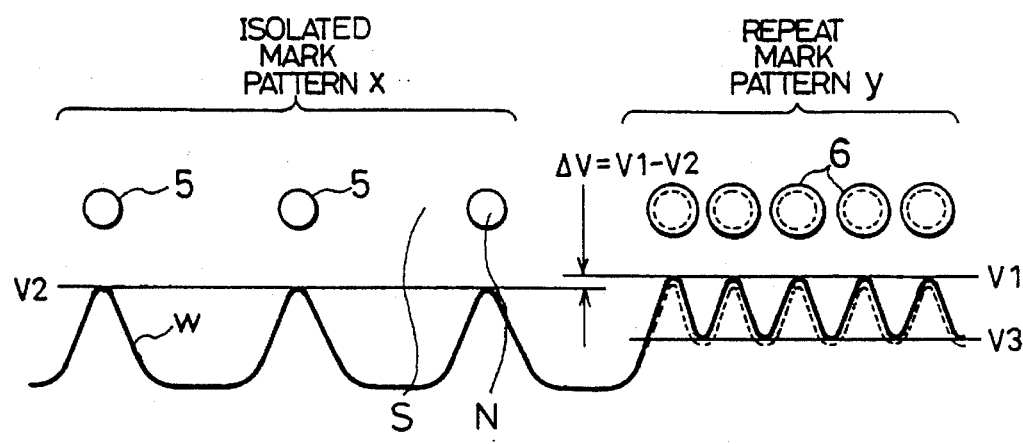
FIG. 2 is an explanatory drawing which shows a relationship between a recording pattern to be recorded by the test-writing recording control apparatus and its reproduced signal.

The semiconductor laser 23 emits a light beam a having an intensity and a pulse length which correspond to the recording signal z to a magneto-optical disk 24 (optical recording medium). As a result, as shown in FIG. 2, recording marks 5 . . . of the isolated mark pattern x and recording marks 6 . . . of the repeat mark pattern y are recorded into the magneto-optical disk 24. Here, the isolated mark pattern x is a pattern, which is difficult to be interfered by a heat, such as the recording marks 5 . . . which are separated from one another, and the repeat mark pattern y is a pattern, which is easily interfered by heat, such as the recording marks 6 . . . which are close to one another.

The test-writing recording control apparatus further includes:

a photo detector 22 for receiving a reflected light b from the magneto-optical disk 24 and photoelectrically converting the reflected light b so as to output a reproduced signal w;

repeat pattern level detection means 1 (first level detection means) for detecting a peak level v1 of the reproduced signal w which correspond to the repeat mark pattern y;

isolated pattern level detection means 2 (second level detection means) for detecting a peak level v2 in a section of the reproduced signal w which corresponds to the isolated mark pattern x; and comparison means 3 for outputting the level difference $\Delta v$ between the peak levels v1 and v2 to the repeat/isolation pattern generating means 4.

Incidentally, the repeat mark pattern y is a first recording pattern made up of a combination of a first microarea (non-mark section between recording marks 6 and 6) which is in a first state (for example, an upper vertical direction of paper is a south pole direction) of the magneto-optical disk 24 and a second microarea (recording mark 6) which is a second recording state (for example, an upper vertical direction of paper is a north pole direction) and is shorter than a light beam diameter. In this case, a relative relationship between the light beam diameter and a length of the second microarea is that the level v1 of the reproduction waveform w from the second microarea (recording mark 6) is not saturated, in other words, the recording mark 6 is shorter than the light beam diameter. Here, if the recording mark 6 becomes longer, the level v1 is saturated. The level of the reproduction waveform w can sensitively changes with a change in a recording condition (for example, a laser power) until the saturation. However, if the saturation occurs, the level of the reproduction waveform w does not fluctuate even if the recording condition is made change, thereby making it impossible to detect a recording mark state. For this reason, the above relationship between the recording mark 6 and the light beam diameter is required so that the level of the reproduction waveform w is not saturated.

In addition, the isolated mark pattern x is a second recording pattern made up of a combination of a third microarea (non-mark section between recording marks 5 and 5), which is the first state (for example, an upper vertical direction of paper is a south pole direction) of the magneto-optical disk 24 and is longer than the first microarea, and the second microarea (recording mark 5) which is the second state (for example, an upper vertical direction of paper is a north pole direction) and is shorter than the light beam diameter. Since the non-mark section between the recording marks 6 and 6 is shorter than the non-mark section between the recording marks 5 and 5, the recording marks 6 . . . are more easily interfered by heat than the recording marks 5 . . . .

With the above arrangement, in the case where the recording marks 5 . . . and the recording marks 6 . . . are recorded by emitting the light beam a having a same intensity and a same pulse length to the magneto-optical disk 24, as indicated by a solid line in FIG. 2, the recording marks 6 . . . which are easily interfered by heat become larger than the recording marks 5 . . . which are difficult to be interfered by heat. For this reason, the peak level v1 in the section of the reproduced signal w corresponding to the repeat mark pattern y becomes larger than the peak level v2 of the reproduced signal w corresponding to the isolated mark pattern x. Therefore, the level difference $\Delta v$ between the peak level V1 and the peak level V2 occurs.

On the contrary, in the case where the recording marks 5 . . . and the recording marks 6 . . . are recorded, if the heat interference between the recording marks 5 and 5, and the heat interference between the recording marks 6 and 6 are same or both the heat interference does not occur, as indicated by a broken line in FIG. 2, the recording marks 6 has a same size as the recording marks 5 . . . . For this reason, the peak levels v1 and v2 becomes equal. Therefore, the level difference $\Delta v$ between the peak level v1 and the peak level v2 becomes 0.

As mentioned above, the intensity and the pulse length of the light beam a are set by the repeat/isolation pattern generating means 4 so that the level difference $\Delta v$ becomes minimum. This make it possible to set the recording condition so that the heat interference at the time of recording information becomes constant. As a result, the information can be accurately recorded.

The use of a CPU (Central Processing Unit) makes it possible to measure a change in $\Delta v$ and to automatically carry out the test-writing recording control while changing the recording condition.

Here, the level difference $\Delta v$ may occurs due to not only the heat interference but also an optical transfer characteristic (OTF). In this case, the total level difference $\Delta v$ is represented by the following formula:

$$\Delta v = \Delta v\ (OTF) + \Delta v\ (thermal).$$

Here, the $\Delta v$ (OTF) is the level difference due to the optical transfer characteristic, and $\Delta v$ (thermal) is the level difference due to the heat interference.

In the case where there exists the $\Delta v$ (OTF), the level difference $\Delta v$ does not become 0, but when the level difference $\Delta v$ becomes minimum, the heat interference becomes same in the like case of the above one. In other words, the recording condition can be set so that the heat interference at the time of recording information becomes constant by the test-writing recording control apparatus of the present embodiment regardless of the $\Delta v$ (OTF). This makes it possible to accurately record the information.

In the above embodiment, the recording condition was set so that the level difference $\Delta v$ between the peak levels v1 and v2 becomes minimum, but even if the recording condition is set so that the level difference between a minimum level v3 in the section of the reproduced signal w corresponding to the repeat mark pattern y and the peak level v2 (v2–v3) becomes maximum, the same results can be achieved.

Figure 3:
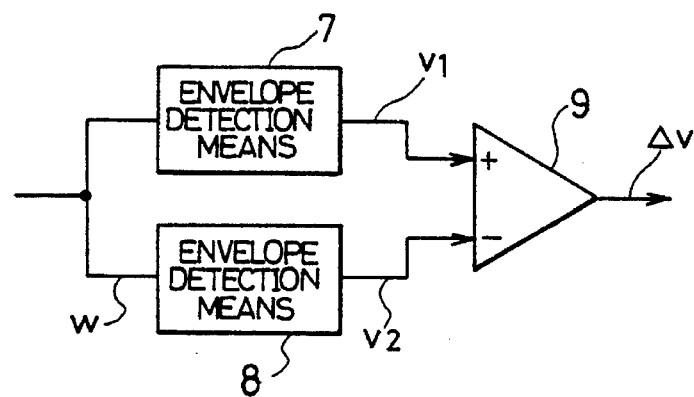
FIG. 3 is a block diagram which shows one portion of the arrangement of the test-writing recording control apparatus.

Concretely, as shown in FIG. 3, an envelope detection means 7 and 8, for example, can be used for the repeat pattern level detection means 1 and the isolated pattern level detection means 2 of the test-writing recording control apparatus, and a subtracter 9 can be used for the comparison means 3.

Figure 4:
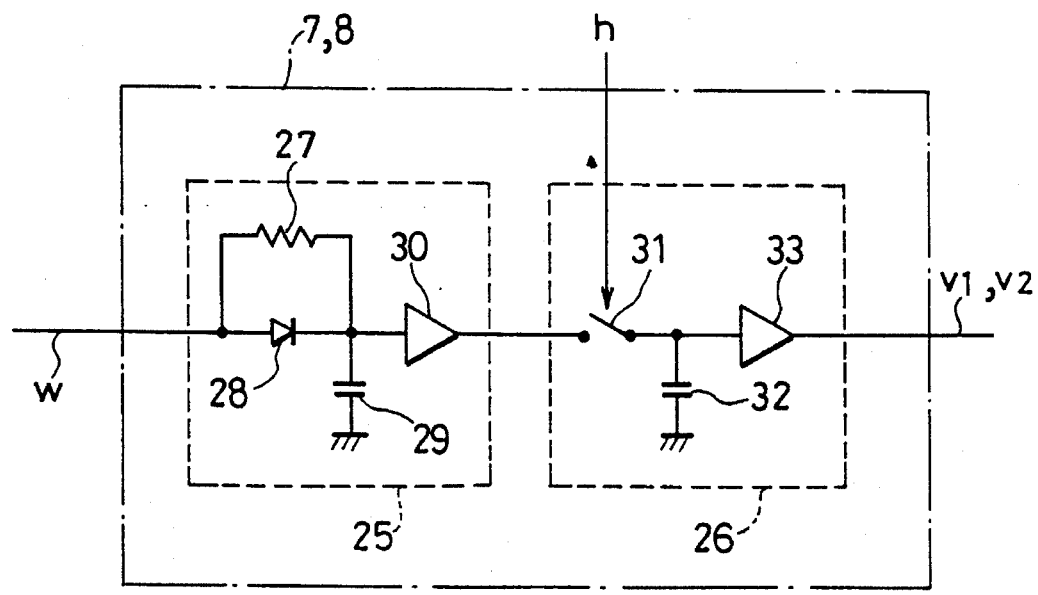
FIG. 4 is a circuit diagram which shows a detailed portion of the arrangement in FIG. 3.

Concretely, as shown in FIG. 4, the envelope detection means 7 and 8 are composed of a peak holding circuit 25 and a sample holding circuit 26, for example. The peak holding circuit 25 consists of resistance 27, a diode 28, a capacitor 29 and a buffer 30. The sample holding circuit 26 consists of a switch 31, a capacitor 32 and a buffer 33. The peak levels v1 and v2 obtained in the peak holding circuit 25 can be taken out by turning on and off the switch 31 in accordance with a timing signal h.

Figure 5:
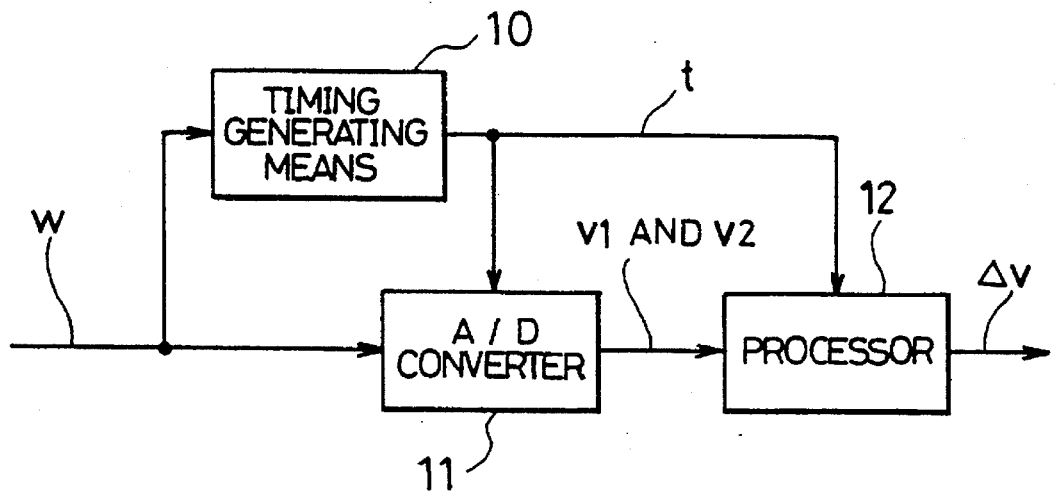
FIG. 5 is a block diagram which shows another example of one portion of the arrangement of the test-writing recording control apparatus.

In addition, As shown in FIG. 5, a timing generating means 10 for generating a timing signal t per peak of the reproduced signal w and an A/D converter 11 for converting the reproduced signal w to a digital signal in accordance with the timing signal t so as to take out the peak levels v1 and v2 of the reproduced signal w can be used for the repeat pattern level detection means 1 and the isolated pattern level detection means 2 of the test-writing recording control apparatus. A processor 12 for calculating a level difference $\Delta v$ (=v1–v2) from the peak levels v1 and v2 in accordance with the timing signal t so as to output it can be used for the comparison means 3.

For example, the timing generating means 10 can be easily composed of a PLL circuit (phase locked loop) for taking out a synchronous clock from the reproduced signal w and a demodulator.

In the present embodiment, as shown in FIG. 2, since only short recording marks are recorded, a recording pulse emitting time of the semiconductor laser can be reduced. Therefore, even in the case where the test-writing is frequently carried out, a deterioration of the semiconductor laser can be restricted, thereby making it possible to provide longer life. Moreover, a fluctuation in a size of the recording mark sensitively responds to a fluctuation in the peak level of the waveform. Therefore, the peak of the reproduced signal waveform is detected by the envelope detection means so that the heat interference can be sensitively detected.

SECOND EMBODIMENT

Figure 6:
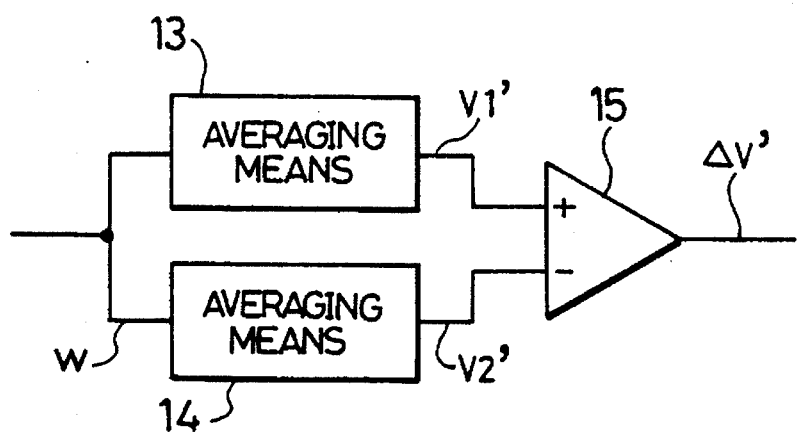
FIG. 6 is a block diagram which shows the test-writing recording control apparatus in the second embodiment of the present invention.
Figure 7:
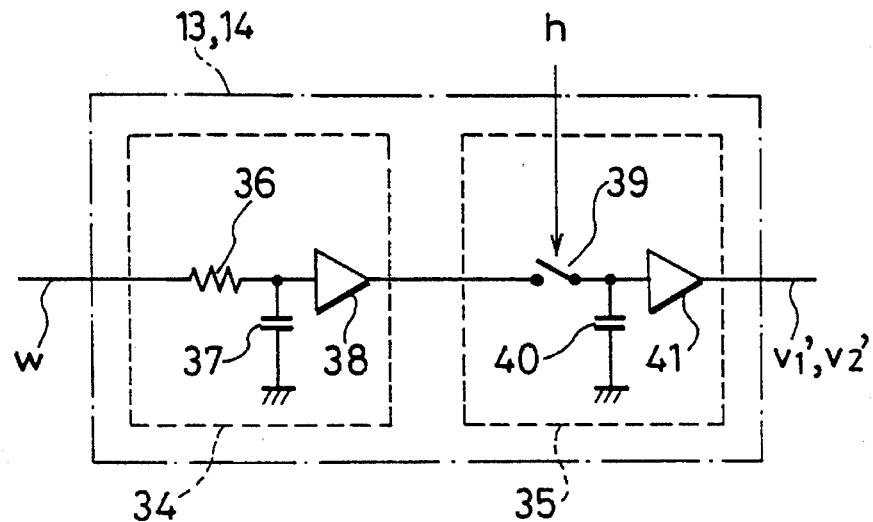
FIG. 7 is a circuit diagram which shows a detailed portion of the arrangement in FIG. 6.

The following description will discuss the second embodiment of the present invention referring to FIG. 6 and FIG. 7. Here, for convenience of explanation, those members of the present embodiment that have the same arrangement and function, and that are shown in the drawings of the aforementioned embodiment are indicated by the same reference numerals and description thereof is omitted.

As shown in FIG. 6, the test-writing recording control apparatus of the present embodiment includes:

averaging means 13 (first level detection means) for detecting an average level v1' in the section of the reproduced signal w corresponding to the repeat mark pattern y;

averaging means 14 (second level detection means) for detecting an average level v2' in the section of the reproduced signal w corresponding to the isolated mark pattern x; and a subtracter 15 (comparison means) for calculating a level difference Δv' (=v1'–v2') from the average levels v1' and v2' so as to output the level difference Δv'.

For example, as shown in FIG. 7 in detail, the averaging means 13 and 14 are composed of a low-pass filter 34 and a sample holding circuit 35. The low-pass filter 34 consists of resistance 36, a capacitor 37 and a buffer 38. The sample holding circuit 35 consists of a switch 39, a capacitor 40 and a buffer 41. The average levels v1' and v2' obtained in the low-pass filter 34 can be taken out by turning on/off the switch 39 in accordance with the timing signal h.

With the above arrangement, the intensity and the pulse length of the light beam a is set so that the level difference Δv' is minimum. This makes it possible to set the recording condition so that the heat interference at the time of recording information is kept constant. As a result, the information can be accurately recorded.

In the above embodiment, it is preferable that a recording area for the exclusive use of test-writing is provided in the magneto-optical disk 24 separately from an information recording area. When the recording condition is set by using the recording area for the exclusive use of test-writing, the possibility that information in the information recording area is broken is eliminated.

In the present embodiment, as shown in FIG. 6, since the level is detected by the averaging means, in the case where a lot of spike noises occur due to a scratch or dust on a recording medium, compared to the envelope detection means, it is impossible to suppress a detection error.

THIRD EMBODIMENT

Figure 8:
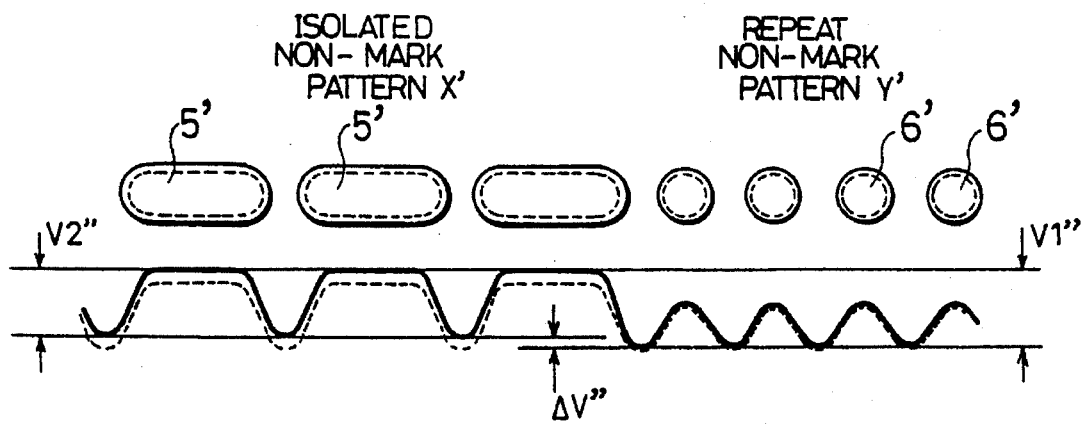
FIG. 8 is an explanatory drawing which shows a relationship between a recording pattern to be recorded by the test-writing recording control apparatus and its reproduced signal.
Figure 9:
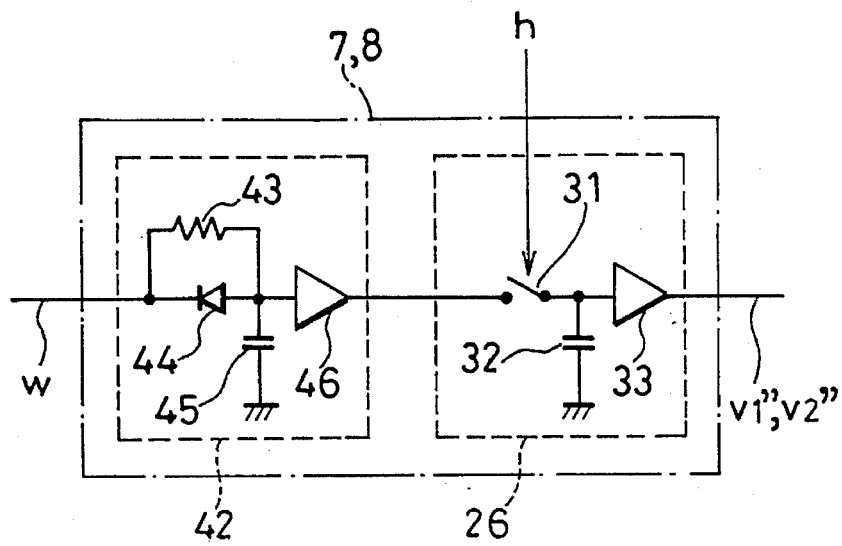
FIG. 9 is a circuit diagram which shows a detailed portion of the arrangement in FIG. 6.

The following description will discuss the third embodiment of the present invention referring to FIG. 8 and FIG. 9. Here, for convenience of explanation, those members that have the same arrangement and functions, and that are described in the aforementioned embodiments are indicated by the same reference numerals and the description thereof is omitted.

Recording marks 5' . . . of an isolated non-mark pattern x' and recording marks 6' . . . of a repeat non-mark pattern y' are recorded to the magneto-optical disk 24. In other words, it is a pattern that the recording marks and the non-marks are respectively exchanged each other with respect to the recording pattern shown in FIG. 2. Here, the isolated non-mark pattern x' is a pattern, which is greatly influenced by the heat interference such like the long recording marks 5' . . . , and the repeat non-mark pattern y' is a pattern, which is slightly influenced by the heat interference such like the recording marks 6' . . . .

In other words, the repeat non-mark pattern y' is a first recording pattern made up of a combination of a first microarea (the recording mark 6'), which is the first state of the magneto-optical disk 24 (for example, an upper vertical direction of paper is the north pole direction), and a second microarea (non-mark between the recording marks 6' and 6') which is the second state (for example, an upper vertical direction of paper is the south pole direction) and is shorter than the light beam diameter. At this time, a relative relationship between the light beam diameter and a length of the second microarea is that the downward level v1" of the reproduction signal w from the second microarea is not saturated, in other words, the non-mark between the recording marks 6' and 6' is shorter than the light beam diameter.

Here, when the non-mark between the recording marks 6' and 6' becomes longer, the level v1" is saturated. Furthermore, the isolated non-mark pattern x' is a second recording pattern made up of a combination of a third microarea (recording mark 5'), which is in the first state of the magneto-optical disk 24 (for example, an upper vertical direction of paper is north pole direction) and is longer than the first microarea, and a second microarea (non-mark between the recording marks 5' and 5') which is the second state and is shorter than the light beam diameter. Since the recording mark 5' is longer than the recording mark 6', they accumulate a large quantity of heat and are greatly influenced by the heat interference. Therefore, the non-mark between the recording marks 5' and 5' easily become shorter than the non-mark between the recording marks 6' and 6'.

With the above arrangement, in the case where the recording marks 5' . . . and the recording marks 6' . . . are recorded by irradiating the light beam a to the magneto-optical disk 24, as indicated by a solid line, the recording marks 5' . . . which is liable to be greatly influenced by the heat interference become larger than the recording marks 6' . . . which is liable to be slightly influenced by the heat interference. For this reason, the downward peak level v2" of the reproduced signal w in the section corresponding to the isolated non-mark pattern x' becomes greater than the downward peak level v1" of the reproduced signal w in the section corresponding the repeat non-mark pattern y'. Therefore, the level difference Δv" occurs.

On the contrary, in the case where the recording marks 5' . . . and the recording marks 6' . . . are recorded, if the heat interference between the recording marks 5' and 5' is identical to the heat interference between the recording marks 6' and 6', or neither heat interference occurs, as indicated by a broken line, the recording marks 5' . . . have a same size as the recording marks 6' . . . . For this reason, the downward peak level v1" of the reproduced signal w is equal to the downward peak level v2". As a result, the level difference Δv" becomes 0.

Therefore, the repeat non-mark pattern y' and the isolated non-mark pattern x' are generated from the repeat/isolation pattern generating means 4 shown in FIG. 1, and the intensity and the pulse length of the light beam is set so that the level difference Δv" becomes minimum. Thereafter, the recording condition or parameter can be set so that the heat interference at the time of recording information becomes constant. This makes it possible to accurately record the information.

The repeat pattern level detection means 1 and the isolated pattern level detection means 2 in the test-writing recording control apparatus of the present embodiment have an arrangement that an internal circuit of the envelope detection means 7 and 8 (FIG. 4) in the test-writing recording control apparatus explained in the first embodiment is replaced by a circuit shown in FIG. 9.

As shown in FIG. 9, the envelope detection means 7 and 8 are composed of a peak holding circuit 42 and a sample holding circuit 26. The peak holding circuit 42 consists of resistance 43, a diode 44, a capacitor 45 and a buffer 46, and the sample holding circuit 26 consists of a switch 31, a capacitor 32 and a buffer 33. The peak levels v1" and v2" obtained in the peak holding circuit 42 can be taken out by turning on/off the switch 31 in accordance with the timing signal h. An only one difference between the peak holding circuit 42 and the peak holding circuit 25 which is shown in FIG. 4 is that the direction of the diode 44 is opposite to that of the diode 28.

Here, in FIG. 2 (also in FIG. 8), the isolated non-mark patterns x' and the repeat non-mark pattern y' are not limited to the pattern shown in the drawings, so two patterns that either of the recording mark lengths or the non-mark lengths are same may be recorded.

In the present embodiment, as shown in FIG. 8, since the long recording mark is recorded, the emitting time of the laser beam is long. This makes it possible to generate greater heat interference. Therefore, compared with the case of the short recording mark, it is possible to detect the heat interference more sensitively.

FOURTH EMBODIMENT

The following description will discuss the fourth embodiment of the present invention referring to FIGS. 10 through 17. Here, for convenience of explanation, those members that have the same arrangement and functions, and that are described in the aforementioned embodiments are indicated by the same reference numerals and the description thereof is omitted.

Figure 10:
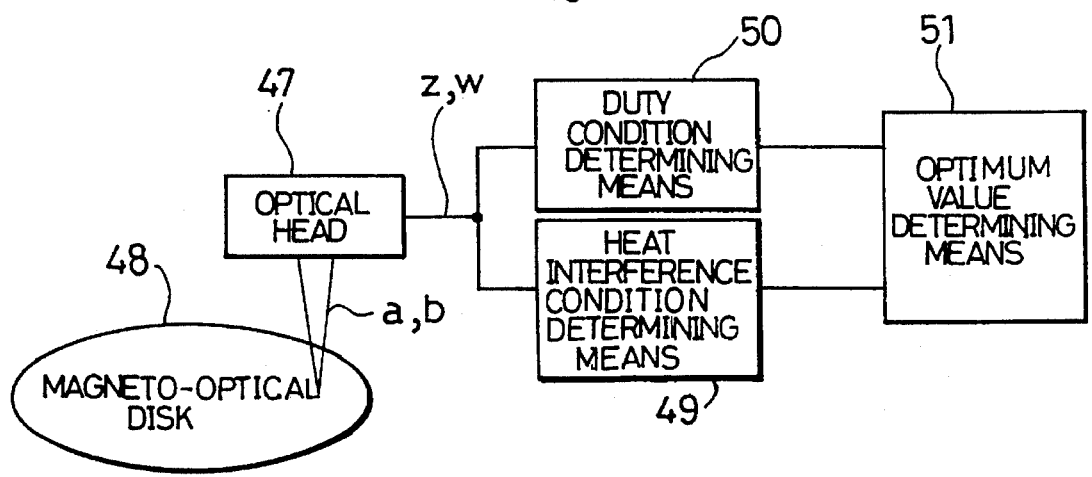
FIG. 10 is a block diagram which shows the test-writing recording control apparatus in the fourth embodiment of the present invention.

For simplification of explanation, a test-writing recording control apparatus shown in FIG. 10 is an example of a test-writing recording control apparatus for carrying out test-writing of information to an optical recording medium by generating an optical recording power in accordance with a sum (or a difference) of (or between) two power values Pb and Pp of a light beam which are mentioned later as a plurality of recording variables so as to respectively optimize Pb and Pp. The two power values Pb and Pp can be optimized by obtaining a relative relationship between the two power values Pb and Pp. However, there arises a problem that in the case where only one relative relationship exists, a relative value of the Pb and Pp can be determined, but an absolute value cannot be determined. Therefore, in this case, the absolute values of Pb and Pp can be obtained by obtaining two relative relationships and by making them satisfy simultaneously. This has a same meaning as an answer to simultaneous equations. Namely, even in the case of a plurality of variables, an answer can be obtained if same number of equations as the variables exist. Here, in the case of three and over power values, the absolute value can be justly determined by obtaining necessary number of relative relationships in order to obtain an answer. For convenience of explanation, the following will illustrate optimization of two power values, namely optimization of the absolute value by obtaining two relative relationships of respective a duty condition and a heat interference condition of the recording marks.

As shown in FIG. 10, the test-writing recording control apparatus of the present embodiment has an almost same arrangement as that of the apparatus of the first embodiment shown in FIG. 1. Difference points are that duty condition determining means 50 for determining a condition so as to optimize a duty of the reproduced signal and optimum value determining means 51 are added.

In other words, the heat interference condition determining means 49 is composed of the repeat pattern level detection means 1, the isolated pattern level detection means 2, the comparison means 3 and the repeat/isolation pattern generating means 4 which are shown in FIG. 1. In FIG. 10, in the optical head 47 to which a recording signal z is transmitted, a semiconductor laser driving circuit 52 for outputting a driving electric current Iw which drives the semiconductor laser 23 based upon the recording signal z shown in FIG. 11, the semiconductor laser 23 and the photo detector 22 which are shown in FIG. 1 are provided.

In the semiconductor laser driving circuit 52 shown in FIG. 11, the recording signal z is inputted to a waveform converting circuit 53 and is converted to a signal for obtaining the power Pb for a bias and to a signal for obtaining the power Pp for a pulse (mentioned later). These signals are transmitted to electric current generating circuits 54 and 55 so that the two electric currents Ib and Ip are generated. The driving electric current Iw of the semiconductor laser 23 is obtained by adding the electric currents Ib and Ip to an adder 56. As a result the semiconductor laser 23 can irradiate a recording power Pw which is the sum of the power Pb for a bias and the power Pp for a pulse.

Figure 12:
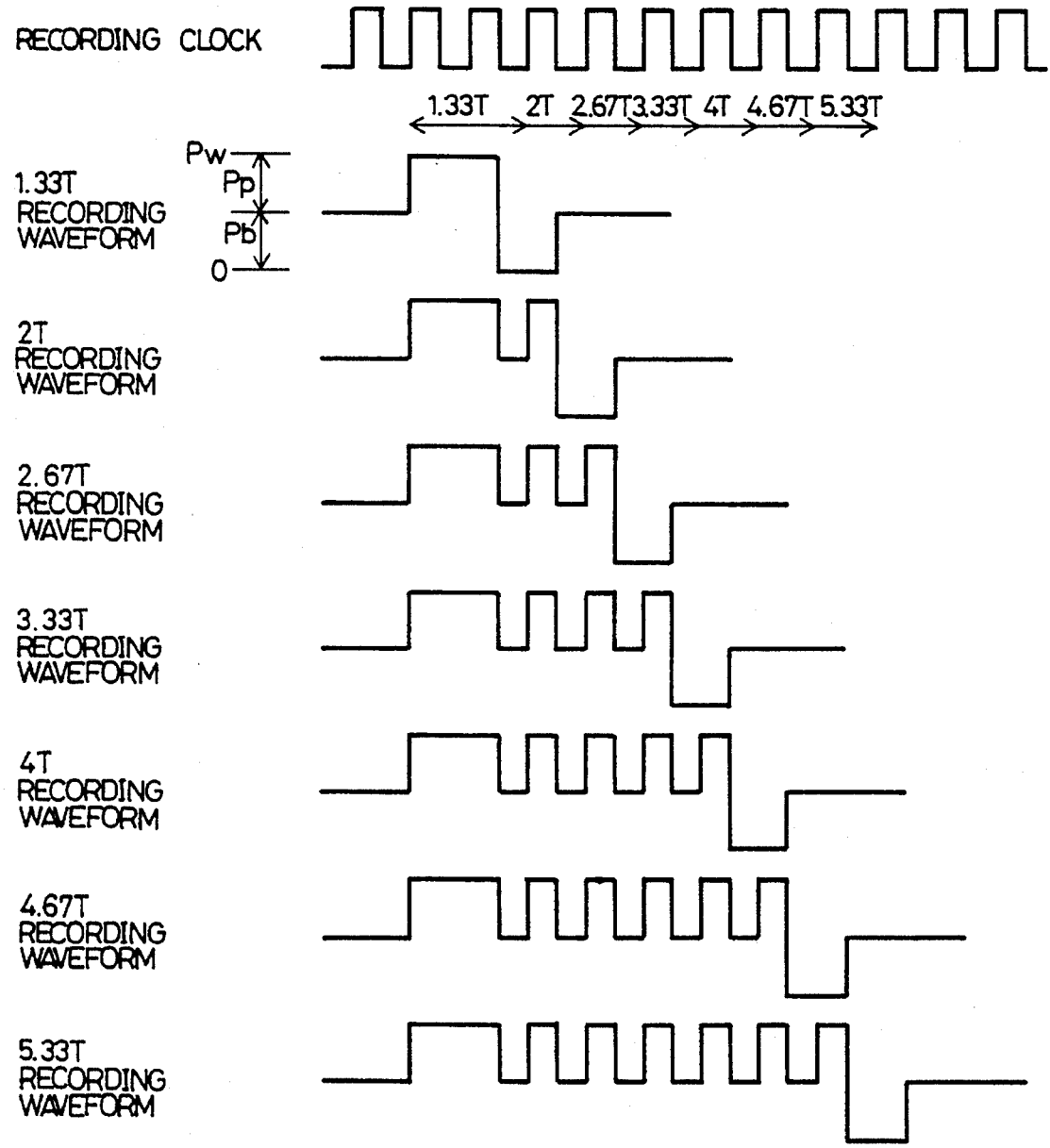
FIG. 12 is a waveform diagram which shows recording waveforms to be recorded by the semiconductor laser driving circuit in FIG. 11.

FIG. 12 is a drawing which shows one embodiment of a waveform of a recording pulse to be irradiated from the semiconductor laser 23. As shown in the drawing, the recording power Pw is the sum of the power Pb for a bias and the power Pp for a pulse. Here, except for this, the recording power Pw may be the difference obtained by subtracting Pb from Pw. As a modulation system, a (1,7) RLL system which is well-known is adopted, and seven kinds of recording waveforms from 1.33T to 5.33T are used.

In FIG. 10, the light beam a obtained in such a way is irradiated from the semiconductor laser 23 in the optical head 47, the test-writing is carried out to the magneto-optical disk 24, and a reflected beam b is photoelectrically converted by the photo detector 22 in the optical head 47 so that the reproduced signal w is outputted. The other description which is identical to FIG. 1 is omitted.

The duty condition determining means 50 is means for determining whether or not the duty of the reproduced signal w is optimum. The optimum value determining means 51 obtains the power values Pb and Pp which simultaneously satisfy two conditions in accordance with outputs from the heat interference condition determining means 49 and from the duty condition determining means 50.

The duty condition determining means 50 and the heat interference condition determining means 49 are replaced by three recording pattern generating means and three recording pattern level detection means so that they can share the circuit.

Figure 13:
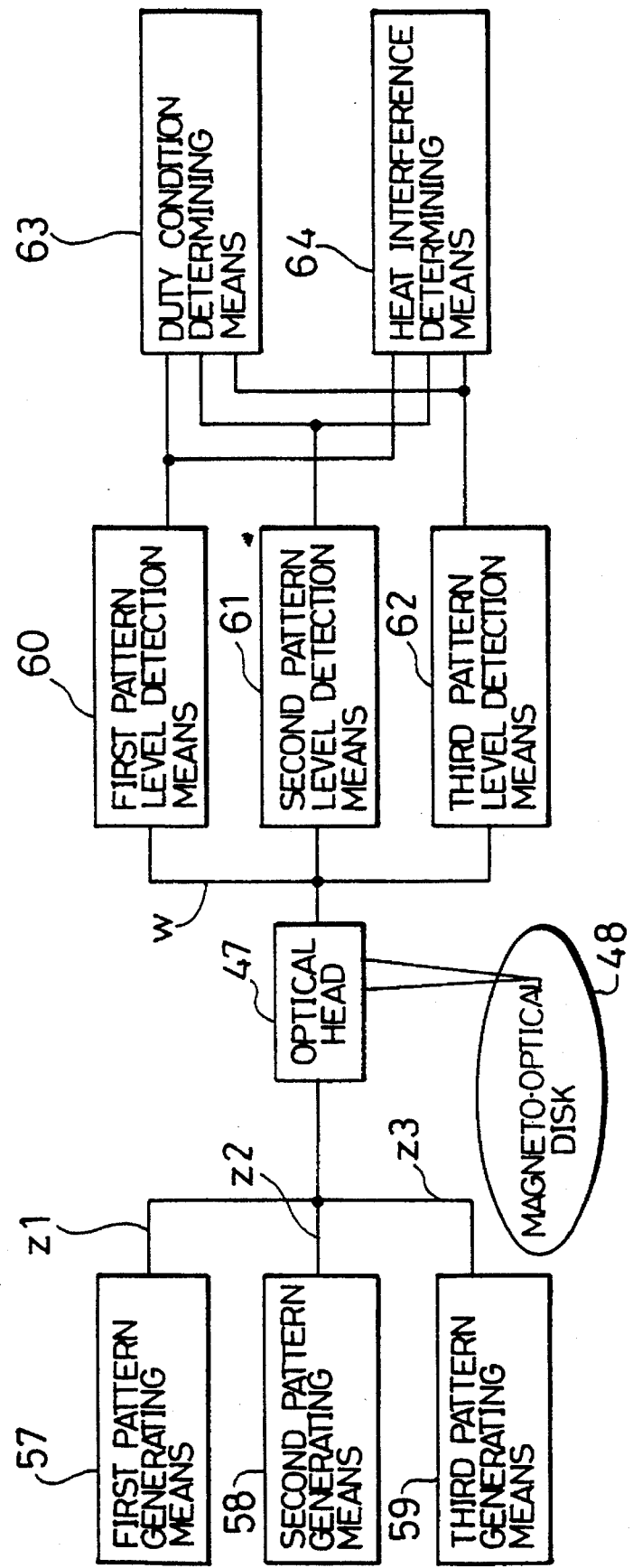
FIG. 13 is a block diagram which shows the test-writing recording control apparatus in detail.

The FIG. 13 is a drawing which shows only a main part in order to clearly explain the above point again. The recording signals z1, z2 and z3, which are generated from a first pattern generating means 57 for the first recording pattern, a second pattern generating means 58 for generating the second recording pattern and a third pattern generating means 59 for generating the third recording pattern, are recorded to the magneto-optical disk 24.

Figure 14:
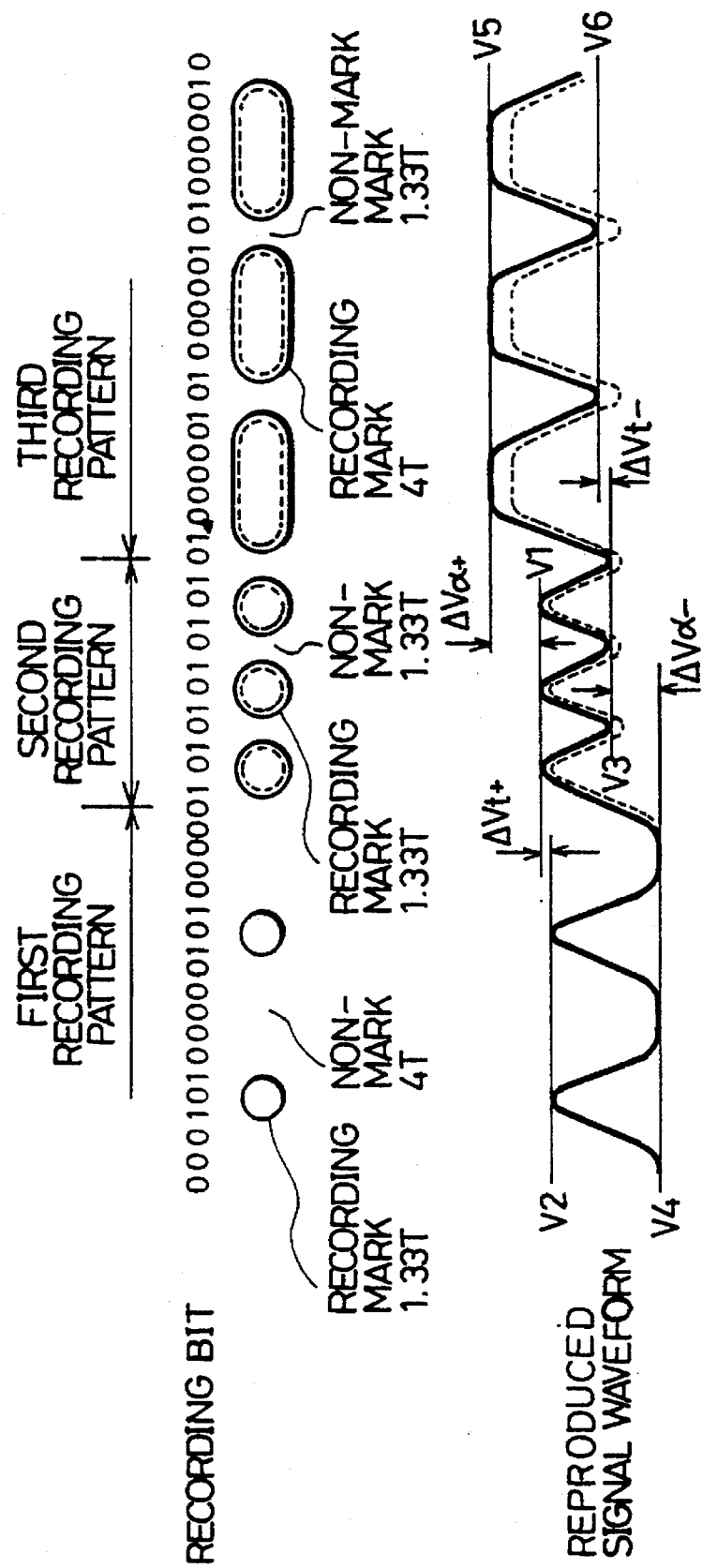
FIG. 14 is an explanatory drawing which shows a relationship between a recording pattern to be recorded by the test-writing recording control apparatus and its reproduced signal.

Here, FIG. 14 shows recording Marks and reproduced signal waveforms of each pattern. The first recording pattern is the isolated mark pattern x shown in FIG. 2 which is made up of a combination of the recording mark 1.33T and the non-mark 4T. The second recording pattern is the repeat mark pattern y shown in FIG. 2, but may be the repeat non-mark pattern y' shown in FIG. 8. The second recording pattern is made up of a combination of the recording mark 1.33T and the non-mark 1.33T. The third recording pattern is the isolated non-mark pattern x' shown in FIG. 8 and is made up of a combination of the recording mark 4T and the non-mark 1.33T.

Figure 15:
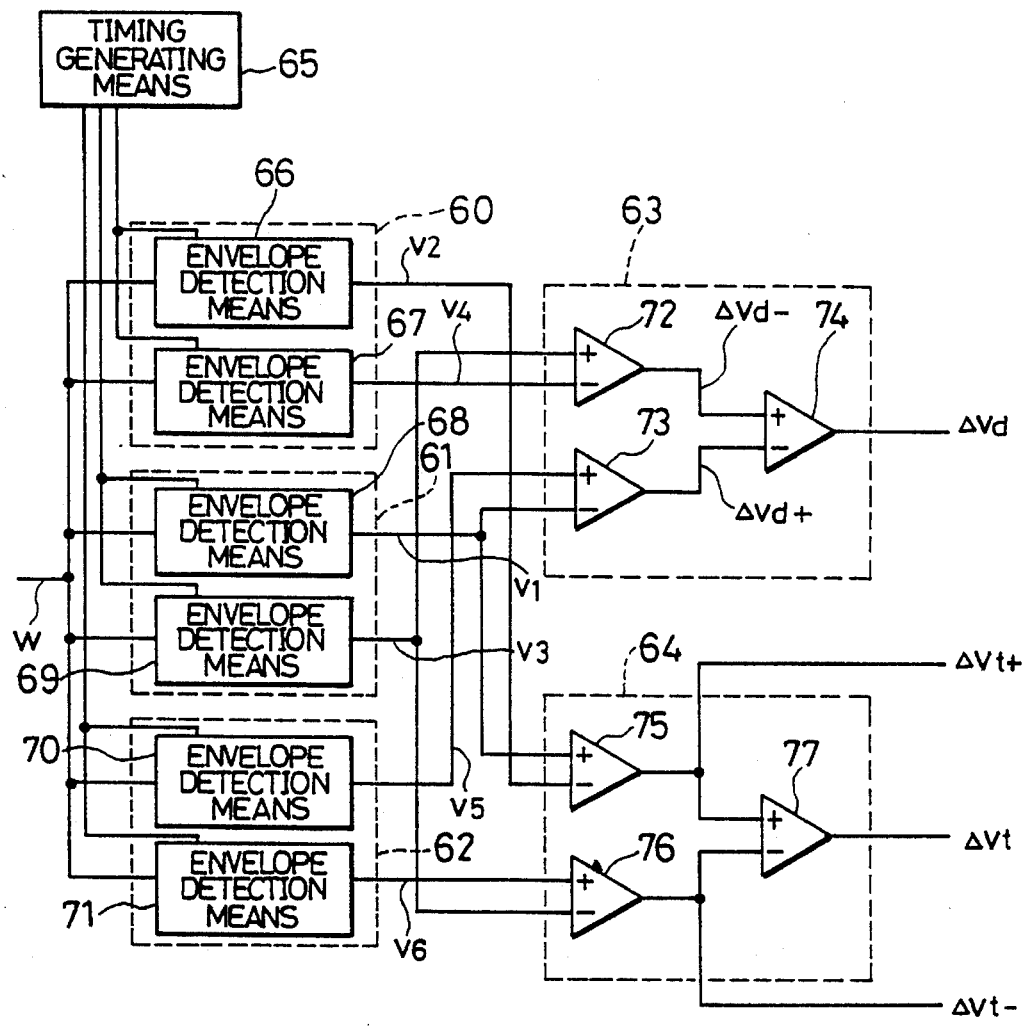
FIG. 15 is a circuit diagram which shows one portion of the arrangement in FIG. 13 in detail.

A peak level and a bottom level of the reproduced signal waveform in each pattern can be detected by the level detection means shown in FIG. 15. The reproduced signal w shown in FIG. 14 is inputted into an envelope detection means 66 and 67 in the first pattern level detection means 60, an envelope detection means 68 and 69 in the second pattern level detection means 61, and an envelope detection means 70 and 71 in the third pattern level detection means 62. A detection timing signal is transmitted from a timing generating means 65 to the envelope detection means 66 through 71. The peak level v2 and the bottom level v4 of the first recording pattern shown in FIG. 14 are detected by the envelope detection means 66 and 67. The peak level v1 and the bottom level v3 of the second recording pattern are detected by the envelope detection means 68 and 69. The peak level v5 and the bottom level v6 of the third recording pattern are detected by the envelope detection means 70 and 71.

The bottom levels v3 and v4 are inputted to subtracting means 72 in the duty condition determining means 63 so that $\Delta vd-$ is obtained. The peak levels v5 and v1 are inputted to subtracting means 73 in the duty condition determining means 63 so that $\Delta vd+$ is obtained. Since in the case where the duties are equal in FIG. 14, $\Delta vd+$ and $\Delta vd-$ are equal, $\Delta vd+$ and $\Delta vd-$ are inputted to the subtracting means 74 in FIG. 15 so that a condition that $\Delta vd$, which is an output of the subtracting means 74, becomes 0 can be the optimum duty condition.

The peak levels v1 and v2 are inputted to the subtracting means 75 in the heat interference condition determining means 64 so that $\Delta vd+$ which is a difference between v1 and v2 is outputted. In FIG. 14, if a condition that the heat interference becomes optimum is satisfied when v1 and v2 are equal, $\Delta vt+$ should become 0.

Figure 16:
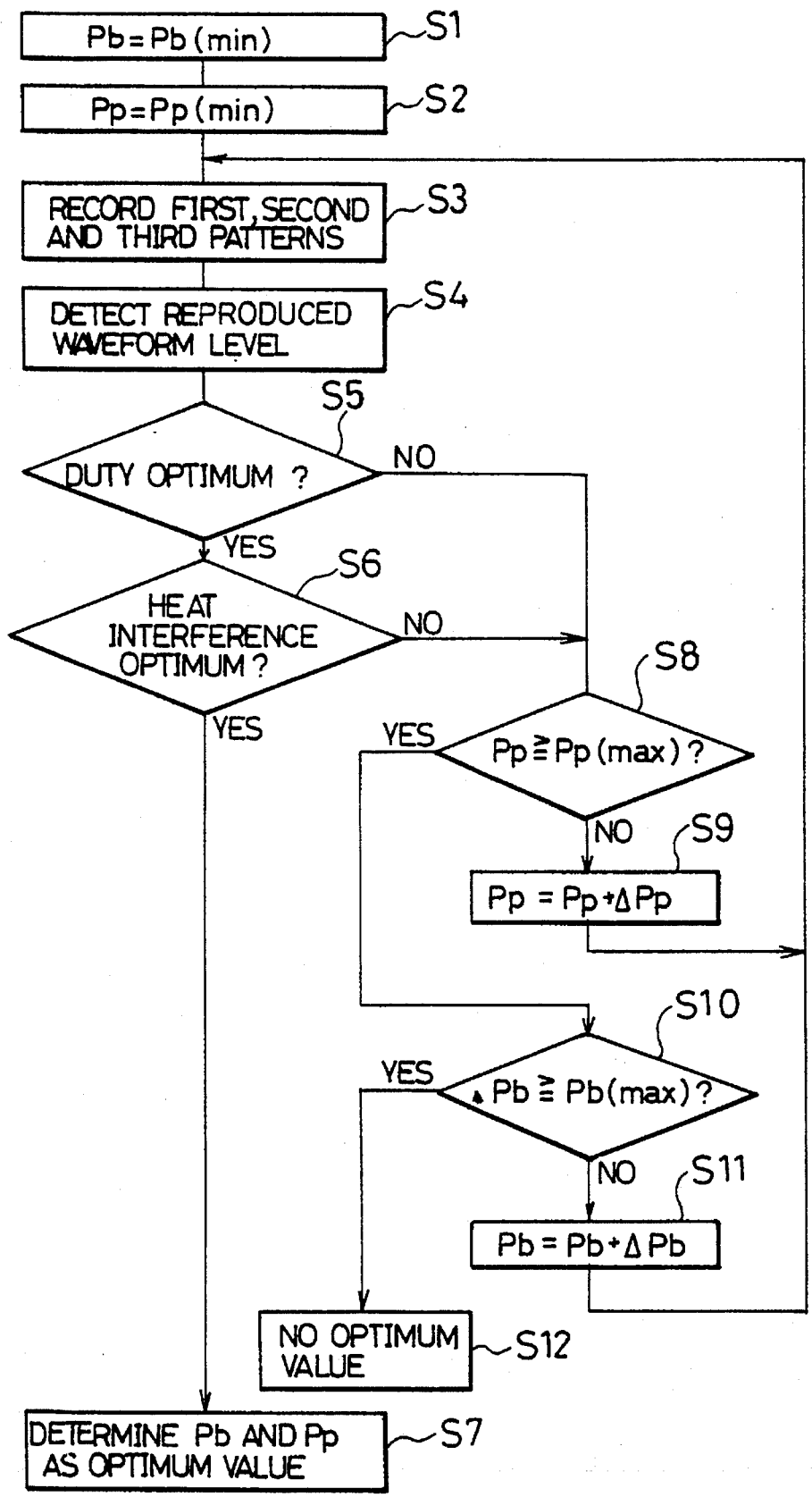
FIG. 16 is a flow chart which shows an operation of the test-writing recording control apparatus.

FIG. 16 shows a flow chart of operations for obtaining Pb and Pp which simultaneously satisfy the optimum duty condition:

$\Delta vd=0$, and the optimum heat interference condition:

$\Delta vt+=0$.

Pb is set as an initial value Pb (min) (s1). Pp is set as an initial value Pp (min) (s2). The first recording pattern, the second recording pattern and the third recording pattern are recorded to the magneto-optical disk 24 (s3). The reproduction waveform levels v1 through v6 of each pattern are detected (s4). A judgement is made as to whether or not the duty is optimum based upon the equation (s5):

$\Delta vd=0$.

If the duty is optimum, the sequence proceeds to (s6), and if not, to (s8). Further, a judgement is made as to whether or not the heat interference is optimum in accordance with the equation (s6):

$\Delta vt+=0$.

If the heat interference is optimum, the sequence proceeds to (s7), and if not, to (s8). If at least one of the duty and the heat interference is not optimum, Pp is compared with a maximum value Pp (max) of Pp in the operation range (s8). If Pp exceeds Pp (max), the sequence proceeds to (s10), and if not, to (s9), $\Delta Pp$ for an increase is added to Pp (s9) and the sequence returns to (s3). Meanwhile, if Pp exceeds Pp (max), Pb is compared with a maximum value Pb (max) of Pb in the operation range (s10). If Pb exceeds Pb (max), the sequence proceeds to (s12), and if not, to (s11). If Pb does not exceed Pb (max), $\Delta Pb$ for an increase is added to Pb (s11) and the sequence returns to (s3). Here, when the Pb exceeds Pb (max), the optimum value cannot be obtained, so the operation ends (s12). In such a manner, Pb and Pp, which simultaneously satisfy the optimum duty condition and the optimum heat interference condition, are determined as the optimum value by gradually increasing Pp and Pb (s7).

Figure 17:
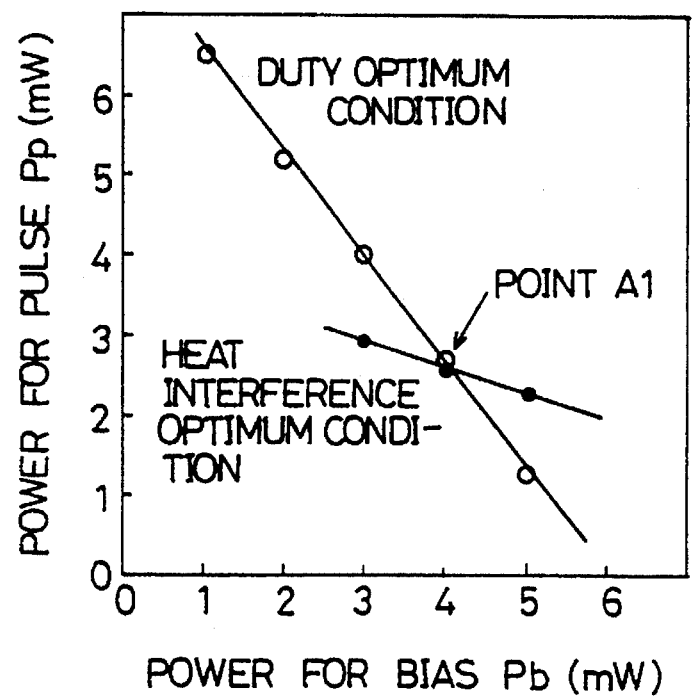
FIG. 17 is a graph which shows an actual measurement of a recording power which is optimized by the test-writing recording control apparatus.

FIG. 17 shows an example that Pp and Pb are optimized in the above manner. Five points made up of a combinations of (Pb,Pp) which satisfy the optimum duty condition, and three points made up of a combination of (Pb, Pp) which satisfy the optimum heat interference condition, are measured. In both the conditions, (Pb, Pp)s are on a straight line. The intersection A1 of both the lines satisfies the following condition:

(Pb,Pp)=(4 mW, 2.6 mW).

Therefore, the optimum value which simultaneously satisfies the two conditions can be determined.

In the present embodiment, as shown in FIG. 14, since the five levels v1–v5 in six peak-levels v1–v6 should be detected, the arrangement can be simplified.

FIFTH EMBODIMENT

The following description will discuss the fifth embodiment of the present invention referring to FIGS. 14, 15, 16 and 18. Here, for convenience of explanation, those members that have the same functions, and that are described in the aforementioned embodiments are indicated by the same reference numerals and the description thereof is omitted.

Like the fourth embodiment, a condition that $\Delta vd$ shown in FIG. 15 becomes 0 is the optimum duty condition.

The bottom levels v6 and v3 shown in FIG. 14 are inputted to subtracting means 76 in the heat interference condition determining means 64 so that $\Delta vt-$ is outputted. If a condition that the heat interference become optimum is satisfied when v6 and v3 are equal, $\Delta vt-$ should become 0.

Figure 18:
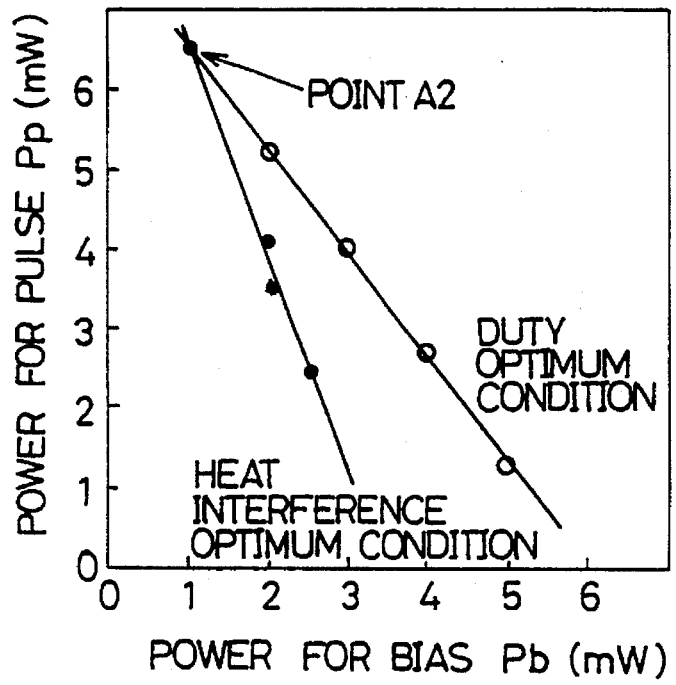
FIG. 18 is a graph which shows an actual measurement of a recording power which is optimized by the test-writing recording control apparatus in the fifth embodiment of the present invention.

FIG. 18 shows an embodiment that letting the optimum duty condition $\Delta vd=0$ and the optimum heat interference condition $\Delta vt-=0$, Pp and Pb are optimized based upon the flow chart in FIG. 16. Five points made up of a combination of (Pb,Pp) which satisfy the optimum duty condition, and three point, which are combinations of (Pb, Pp) and satisfy the optimum heat interference condition are measured. In both the conditions, (Pb, Pp)s are on a straight line. The intersection A2 of both the lines satisfies the following relation:

(Pb,Pp)=(1 mW, 6.5 mW).

Therefore, the optimum value which simultaneously satisfies the two conditions can be determined.

In the present embodiment, as shown in FIG. 14, since the five levels v1 and V3–v6 in six peak levels v1–v6 should be detected, the arrangement can be simplified.

SIXTH EMBODIMENT

Figure 19:
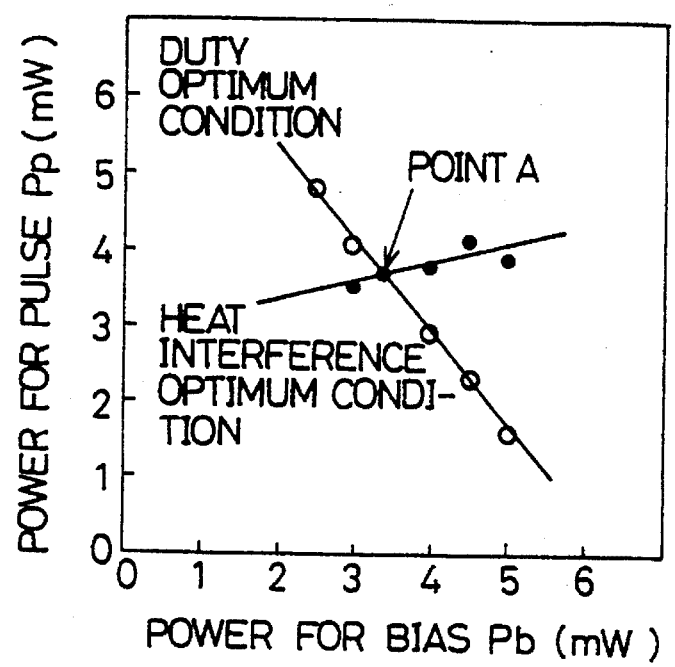
FIG. 19 is a graph which shows an actual measurement of a recording power which is optimized by the test-writing recording control apparatus in the sixth embodiment of the present invention.

The following description will discuss the sixth embodiment of the present invention referring to FIGS. 14, 15 and 19. Here, for convenience of explanation, those members that have the same functions, and that are described in the aforementioned embodiments are indicated by the same reference numerals and the description thereof is omitted.

In FIG. 15, a condition that $\Delta vd$ becomes 0 is the optimum duty condition.

In the fourth and fifth embodiments, the heat interference optimum condition is obtained when only either of $\Delta vt+$ or $\Delta vt-$ becomes 0. However, in FIG. 14, when $\Delta vt+$ and $\Delta vt-$ are equal, the heat interference occurs uniformly on each pattern, so the heat interference condition can be optimized more accurately.

In FIG. 15, $\Delta vt+$ and $\Delta vt-$ are inputted to subtracting means 77 in the heat interference condition determining means 64 so that a difference $\Delta vt$ between $\Delta vt+$ and $\Delta vt-$ is outputted. As mentioned above, a combination of Pb and Pp is obtained so that $\Delta vt$ becomes 0, thereby making it possible to optimize both the duty and heat interference conditions.

FIG. 19 shows an embodiment that letting the optimum duty condition $\Delta vd=0$ and the optimum heat interference condition $\Delta vt=0$, Pb and Pp are optimized based upon the flow chart in FIG. 16. Six points made up of a combination of (Pb,Pp) and satisfy the optimum duty condition, and five points made up of a combination of (Pb, Pp) which satisfy the optimum heat interference condition are measured. In both the conditions, (Pb, Pp)s are on a straight line. The intersection A of both the lines satisfies the following relationship:

(Pb,Pp)=(3.4 mW, 3.7 mW).

Therefore, the optimum value which simultaneously satisfies the two conditions can be determined.

In the present embodiment, as shown in FIG. 19, compared with FIGS. 17 and 18, the line of the optimum duty condition intersects the line of the optimum heat interference condition deeper, so the intersection can be accurately obtained.

SEVENTH EMBODIMENT

Figure 20:
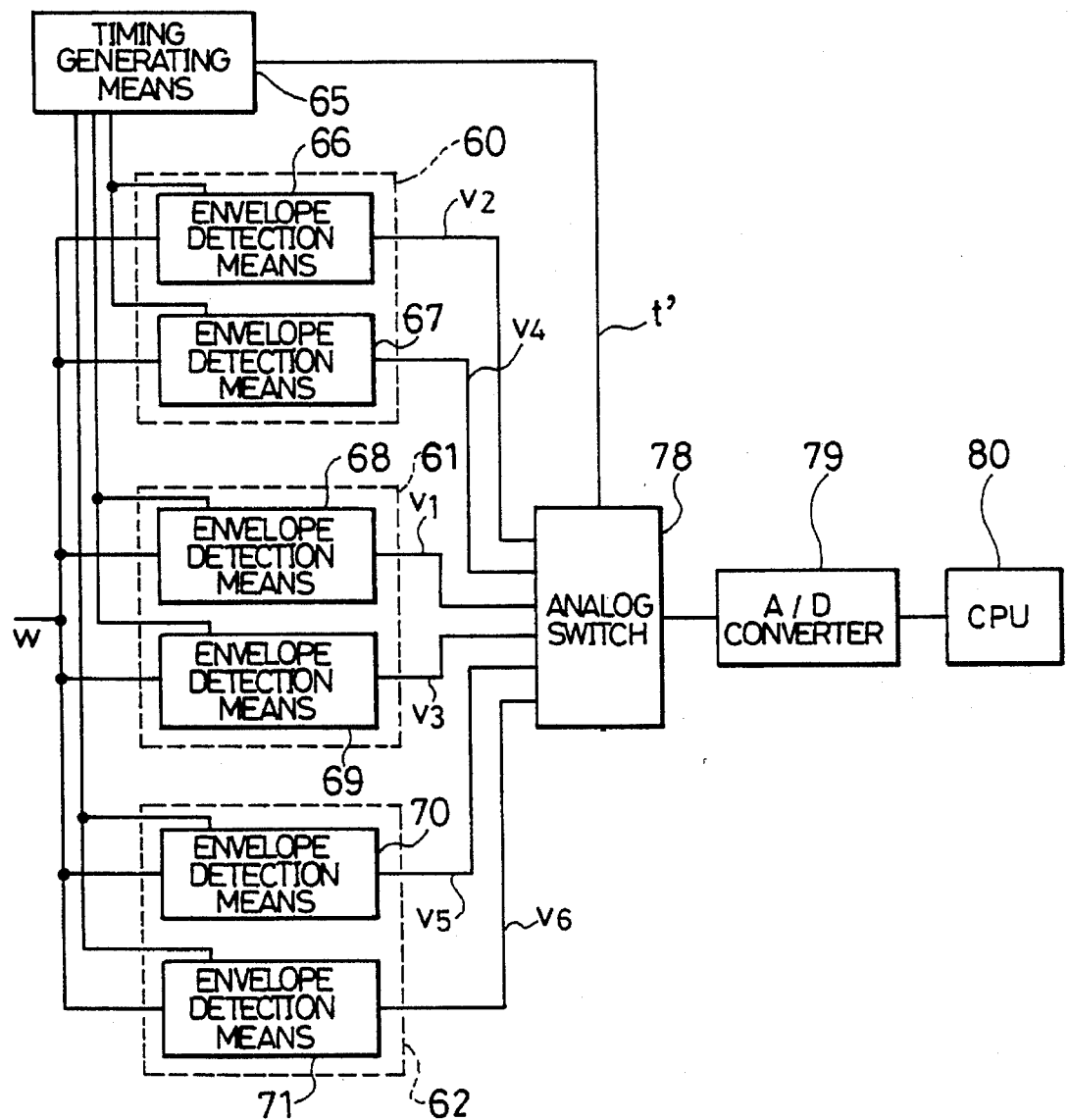
FIG. 20 is a block diagram which shows a detailed portion of the arrangement of the test-writing recording control apparatus in the seventh embodiment of the present invention.

The following description will discuss the seventh embodiment of the present invention referring to FIG. 20. Here, for convenience of explanation, those members that have the same functions, and that are described in the aforementioned embodiments are indicated by the same reference numerals and the description thereof is omitted.

The test-writing recording control apparatus of the present embodiment has an arrangement that the duty condition determining means 63 and the heat interference condition determining means 64 of the level detection means shown in FIG. 15 in the sixth embodiment are replaced by an analog switch 78, an A/D converter 79 and a CPU 80, as shown in FIG. 20.

In other words, V1 through V6 which are the peak levels and the bottom levels of the reproduced signal waveform shown in FIG. 14 are inputted to the analog switch 78, and one level is successively selected from v1 through v6 in accordance with a timing signal t' transmitted from the timing generating means 65 so as to be inputted to the A/D converter 79. A converted digital signal is inputted to the CPU 80, and in the CPU 80, letting the optimum duty condition $\Delta vd=0$ and the optimum heat interference condition $\Delta vt=0$, in the same way as the sixth embodiment, $\Delta vd$, $\Delta vt+$, $\Delta vt-$ and $\Delta vt$ can be detected based upon the flow chart in FIG. 16.

In the present embodiment, as shown in FIG. 20, after an A/D conversion is temporarily made on each peak level, the level difference is calculated by the CPU, thereby making it possible to simplify the arrangement.

EIGHTH EMBODIMENT

Figure 21:
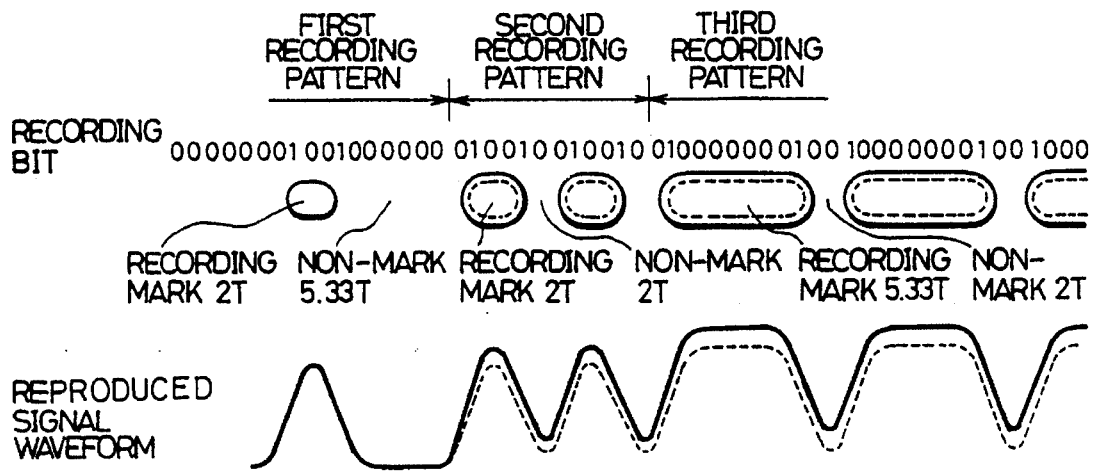
FIG. 21 is an explanatory drawing which shows a relationship between a recording pattern to be recorded and its reproduced signal in the eighth embodiment of the present invention.

The following description will discuss the eighth embodiment of the present invention referring to FIG. 21. Here, for convenience of explanation, those members that have the same functions, and that are described in the aforementioned embodiments are indicated by the same reference numerals and the description thereof is omitted.

As shown in the drawing, the first recording pattern is an isolated mark pattern and is made up of a combination of the recording mark 2T and the non-mark 5.33T. The second recording pattern is a repeat mark pattern and is made up of a combination of the recording marks 2T and the non-mark 2T. The third recording pattern is an isolated non-mark pattern and is made up of a combination of the recording mark 5.33T and the non-mark 2T. Similarly, the optimization of the duty and heat interference can be performed by these patterns.

In the present embodiment, as shown in FIG. 21, since the recording mark 1.33T and the non mark 1.33T in FIG. 14 are replaced by the recording mark 2T and the non-mark 2T, an decrease in the waveform level due to OTF can be restricted, thereby making it possible to detect the heat interference more accurately.

NINTH EMBODIMENT

Figure 22:
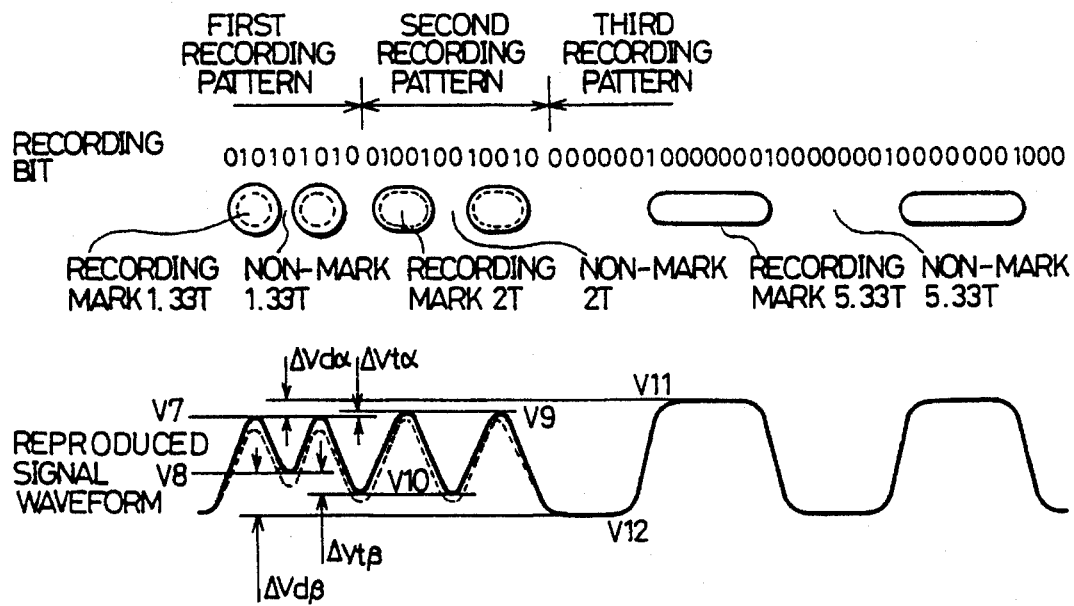
FIG. 22 is an explanatory drawing which shows a relationship between a recording pattern to be recorded and its reproduced signal in the ninth embodiment of the present invention.
Figure 23:
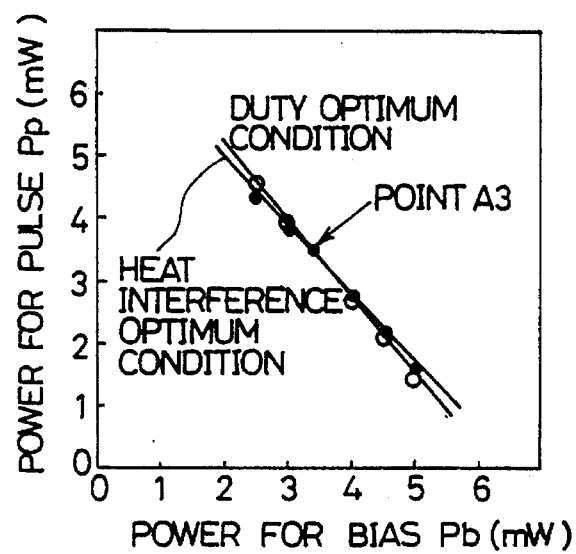
FIG. 23 is a graph which shows an actual measurement of a recording power which is optimized in the ninth embodiment.

The following description will discuss the ninth embodiment of the present invention referring to FIGS. 22 and 23. Here, for convenience of explanation, those members that have the same functions, and that are described in the aforementioned embodiments are indicated by the same reference numerals and the description thereof is omitted.

As shown in FIG. 22, the first, second and third recording patterns are repeat patterns only whose lengths are different. The first recording pattern is made up of a combination of the recording mark 1.33T and the non-mark 1.33T. The second recording pattern is made up of a combination of the recording mark 2T and the non-mark 2T. The third recording pattern is made up of a combination of the recording mark 5.33T and the non-mark 5.33T. The peak level v7 and the bottom level v8 are detected from the first recording pattern, the peak level v9 and the bottom level v10 from the second recording pattern and the peak level v11 and the bottom level v12 from the third recording pattern. A condition that $\Delta vd\alpha(=v11-v7)$ and $\Delta vd\beta (=v8-v12)$ are equal is the optimum duty condition. Furthermore, a condition that $\Delta vt\alpha (=v9-v7)$ and $\Delta vt\beta (=v8-v10)$ are equal is the optimum heat interference condition.

FIG. 23 shows an embodiment that Pp and Pb are optimized in the above manner. Six points made up of a combination of (Pb,Pp) which satisfies the optimum duty condition, and six points made up of a combination of (Pb,Pp) which satisfies the optimum heat interference condition were measured. In both the conditions, (Pb,Pp)s are on a straight line. The point A3 which is the intersection of the two lines satisfies the following relationship:

(Pb,Pp)=(3.4 mW, 3.5 mW).

Therefore, the optimum value which simultaneously satisfies the two conditions can be determined.

In the present embodiment, compared with the waveform patterns in FIGS. 14 and 21, the waveform pattern in FIG. 22 does not have a dc component, so a fluctuation in the level due to C coupling of the circuit does not occur. As a result, it is possible to detect the peak level more accurately.

TENTH EMBODIMENT

Figure 24:
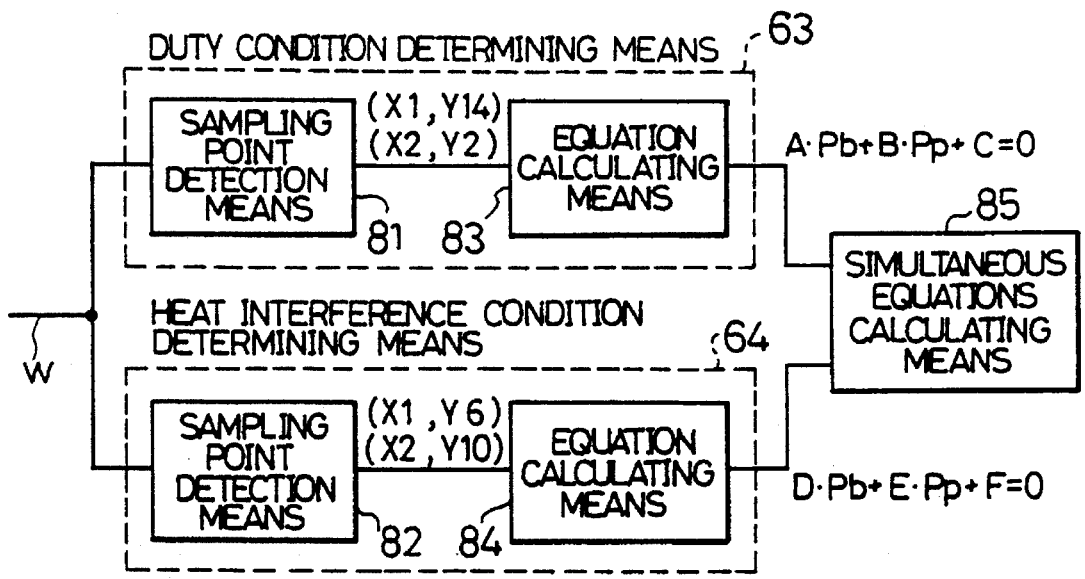
FIG. 24 is a block diagram which shows one portion of the arrangement of the test-writing recording control apparatus in the tenth embodiment of the present invention.
Figure 25:
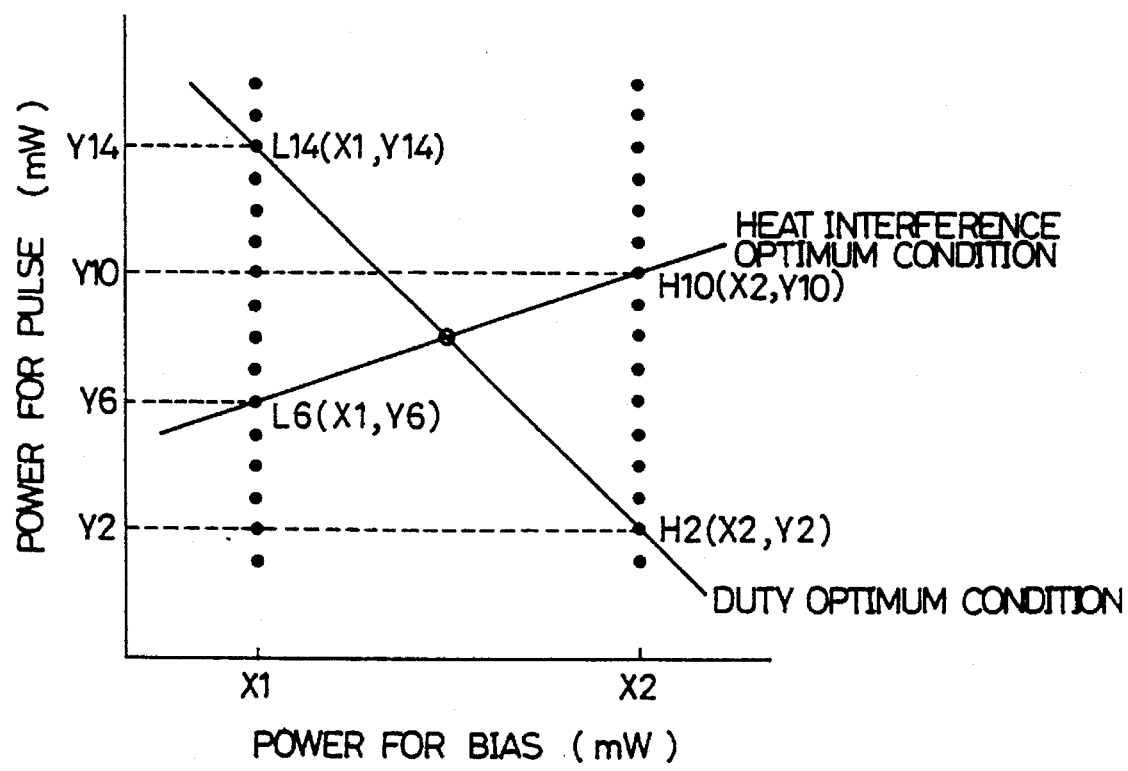
FIG. 25 is a graph which shows an actual measurement of a recording power which is optimized by the test-writing recording control apparatus.
Figure 26:
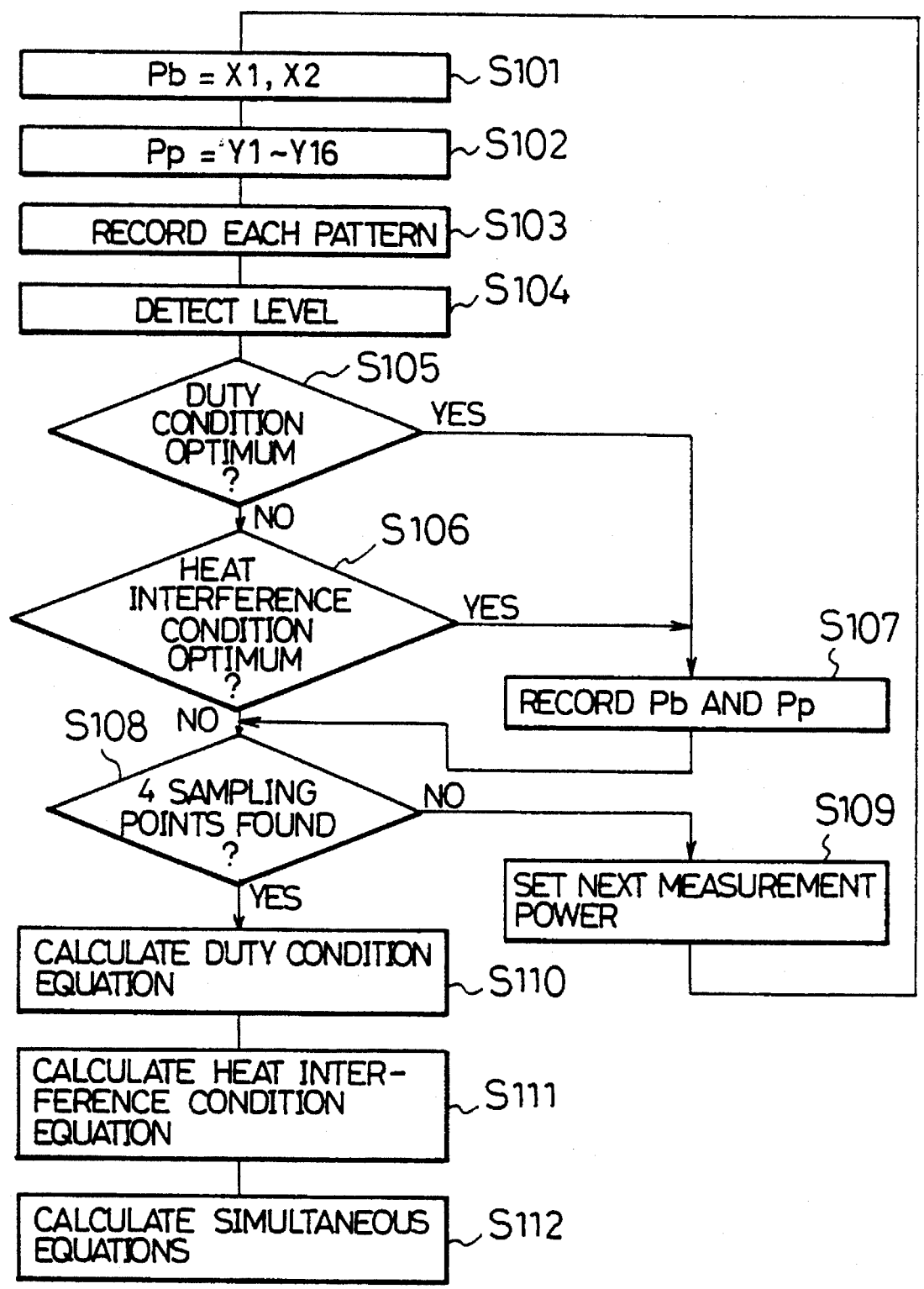
FIG. 26 is a flow chart which shows an operation of the test-writing recording control apparatus.

The following description will discuss the tenth embodiment of the present invention referring to FIGS. 24 through 26. Here, for convenience of explanation, those members that have the same functions, and that are described in the aforementioned embodiments are indicated by the same reference numerals and the description thereof is omitted.

In the aforementioned manners, since the conditions is optimized by gradually changing Pp and Pb, the test had to be performed many times, so considerable time is required for the optimization. Therefore, the following description will discuss a high-speed optimizing method which reduces the number of the tests.

As shown in FIGS. 17 through 19 and 23, each (Pb,Pp) which satisfies the optimum duty condition and the optimum heat interference condition is on a straight line. Therefore, equations of the two straight lines are obtained and the simultaneous equations are solved so as to obtain Pb and Pp, thereby making it possible to ensure the high-speed optimization. In order to solve the equation of the optimum duty condition, two measurement sampling points which satisfy the optimum duty condition are required, and in order to solve the equation of the optimum heat interference condition, two measurement sampling points which satisfy the optimum heat interference condition are required. In other words, the two equations can be solved only by obtaining the total of the four sampling points, and furthermore, the optimum condition which satisfies both the conditions can be determined.

As shown in FIG. 24, in the present embodiment, the reproduced signal w of each recording pattern which has been recorded to the magneto-optical disk 24 is transmitted to sampling point detection means 81 and equation calculating means 83 which work as the duty condition determining means 50, and sampling point detection means 82 and equation calculating means 84 which work as the heat interference condition determining means 49. As a result, the sampling point detection means 81 detects the two sampling points (X1,Y14) and (X2,Y2) which satisfy the optimum duty condition in FIG. 25 from the reproduced signal w. In the like manner, the sampling point detection means 82 detects the two sampling points (X1,Y6) and (X2 and Y10) which satisfy the optimum heat interference condition. Next, the two sampling points (X1,Y14) and (X2,Y2) which have been detected by the sampling point detection means 81 are inputted to the equation calculating means 83 and a following equation which is equivalent to the optimum duty condition line in FIG. 25 is calculated:

$$A \cdot Pb + B \cdot Pp + C = 0.$$

In the like manner, the two sampling points (X1,Y6) and (X2,Y10) which have been detected by the sampling point detection means 82 are inputted to equation calculating means 85 and the following equation which is equivalent to the optimum heat interference condition line in FIG. 25 is calculated:

$$D \cdot Pb + E \cdot Pp + F = 0.$$

The two equations are inputted to simultaneous equations calculating means 85 as the optimum value determining means 51 and an answer to the simultaneous equations, namely, the intersection in FIG. 25 is obtained, thereby making it possible to determine the optimum value.

The following description will discuss the above operation based upon the flow chart in FIG. 26.

Pb is set as an initial value X1 (s101). Pp is set as an initial value Y1 (s102). The first recording pattern, the second recording pattern and the third recording pattern are recorded to the magneto-optical disk 24 (s103). The levels of reproduced signal waveform v1 through v6 of each pattern are detected (s104). A judgement is made as to whether or not the duty is optimum ($\Delta vd=0$) (s105). If the duty is judged optimum, the sequence goes to (s107) and the Pb and Pp at that time are stored. If not, the sequence goes to (s106) and a judgement is made as to whether or not the heat interference is optimum ($\Delta vt=0$) (s106). If the heat interference is judged optimum, the sequence goes to (s107) and Pb and Pp at that time are stored. If not, a judgement is made as to whether or not four sampling points can be detected (s108). If the detection is completed, the equation of the optimum duty condition is calculated (s110). If not, the next Pp is set as Y2 so that the sequence goes to (s103) and the sequence is repeated by successively changing Pp. When Pp proceeds to Y1–Y16 shown in FIG. 25, Pb is changed to X2 and the sequence is repeated by changing Pp from Y1 to Y16 again.

In such a manner, since the value of Pb is limited to only X1 and X2, for example, the number of testing can be greatly reduced. After the equation of the optimum duty condition is calculated, the equation of the optimum heat interference condition is calculated (s111). The intersection is obtained from the simultaneous equations so as to determine the optimum value (s112).

As mentioned above, in the present embodiment, the number of test recording and reproduction of information can be reduced by limiting the sampling points, thereby making it possible to promptly optimize the recording condition.

ELEVENTH EMBODIMENT

Figure 27:
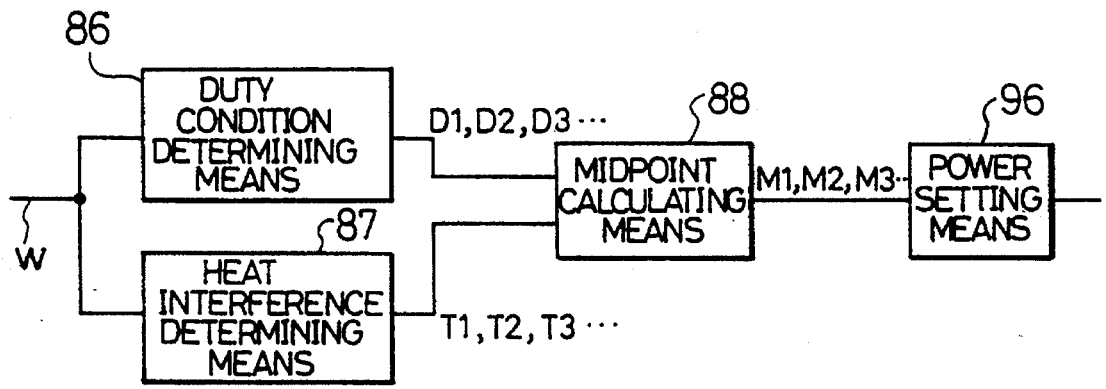
FIG. 27 is a block diagram which shows one portion of the arrangement of the test-writing recording control apparatus in the eleventh embodiment of the present invention.
Figure 28:
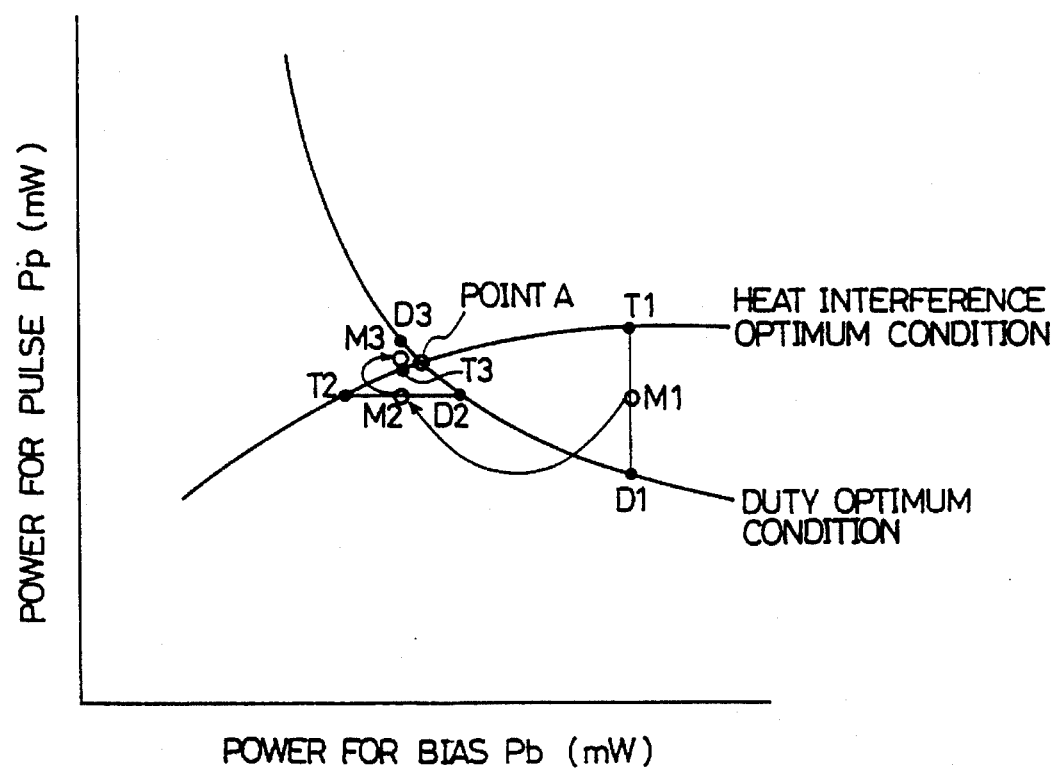
FIG. 28 is a graph which shows an actual measurement of a recording power which is optimized by the test-writing recording control apparatus.
Figure 29:
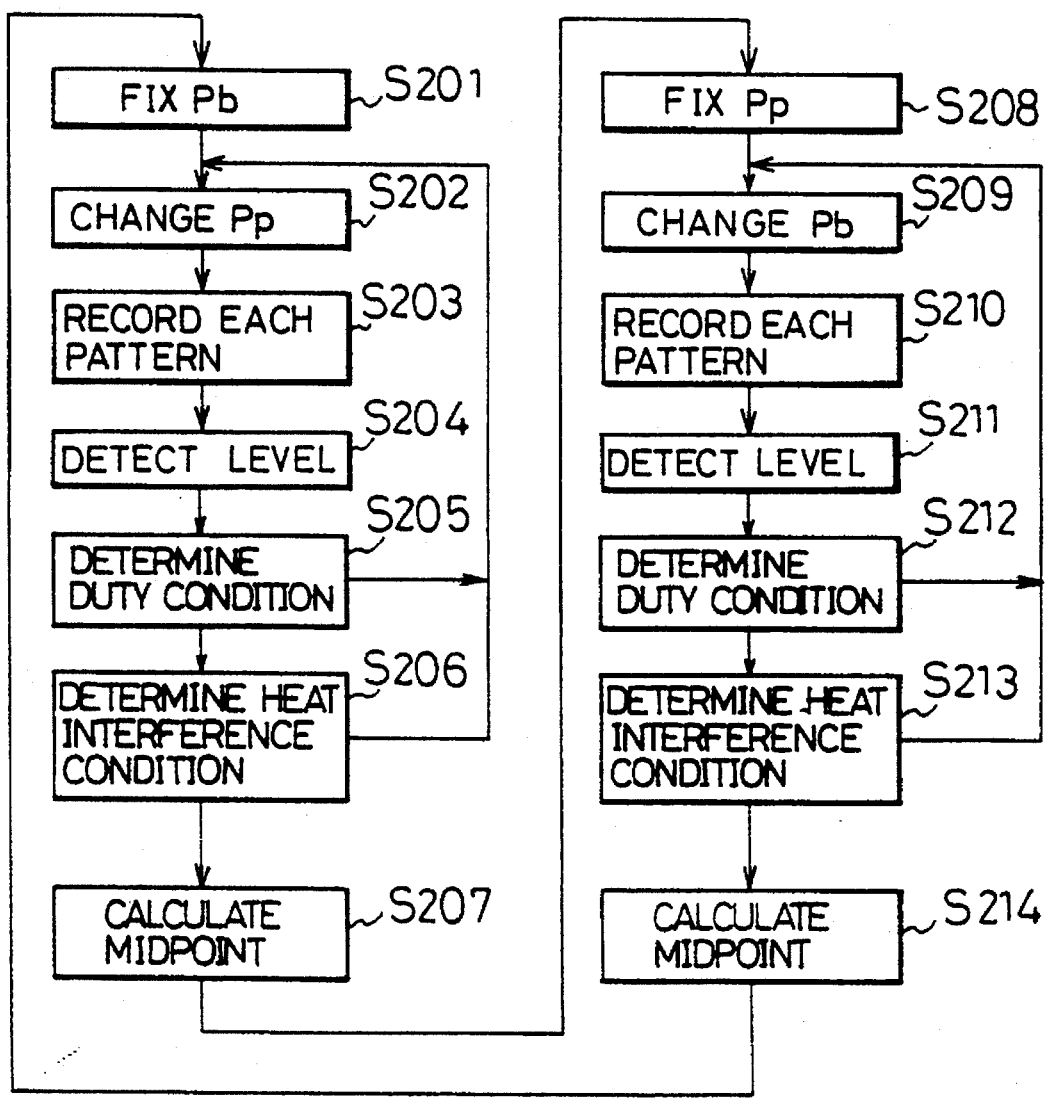
FIG. 29 is a flow chart which shows an operation of the test-writing recording control apparatus.

The following description will discuss the eleventh embodiment of the present invention referring to FIGS. 27 through 29. Here, for convenience of explanation, those members that have the same functions, and that are described in the aforementioned embodiments are indicated by the same reference numerals and the description thereof is omitted.

The embodiments up to tenth discussed the case where the optimum duty condition and the optimum heat interference condition are on the straight lines, but they may not on the straight lines, for a detail, they may form a slightly curved line. The present embodiment will discuss a method capable of optimizing Pb and Pp even in such a case.

In FIG. 27, the reproduced signal w is respectively inputted to a duty condition determining means 86 for detecting a point where the duty of the reproduced signal becomes optimum and to a heat interference condition determining means 87 for detecting a point where the heat interference becomes optimum. While changing Pp with Pb set as a certain value and recording information, the duty condition determining means 86 detects a combination of Pb and Pp which provides the optimum duty of the reproduced signal, namely, an optimum point of the duty condition D1 as shown in FIG. 28. In the like manner, the heat interference condition determining means 87 detects an optimum point of the heat interference condition T1 which provides the optimum heat interference.

As shown in FIG. 28, the points which satisfy the optimum duty condition and the optimum heat interference condition are respectively on the optimum duty condition line and the optimum heat interference condition line. However, since each line is not a straight line, its intersection cannot be obtained by the simultaneous equations calculating means which has been explained in the aforementioned embodiment.

Therefore, a midpoint calculating means 88 shown in FIG. 27 calculates a midpoint M1 of the optimum point D1 of the duty condition and the optimum point T1 of the heat interference.

Successively, while Pb is being changed with the value of Pp at the midpoint M1 fixed and information is being recorded, a point D2 where the duty of the reproduced signal becomes optimum and a point T2 where the heat interference becomes optimum are detected. Successively, in the like manner of the above one, a midpoint M2 of D2 and T2 is calculated.

Next, while Pp is being changed with the value of Pb at the midpoint M2 fixed and information is being recorded, a point D3 where the duty of the reproduced signal becomes optimum and a point T3 where the heat interference becomes optimum are detected. Successively, in the like manner of the above one, a midpoint M3 of D3 and T3 is calculated.

In the above manner, as the points where the duty and the heat interference of the reproduced signal become optimum and the midpoints of these two points are repeatedly obtained with Pb and Pp fixed alternatively, the midpoints M1, M2, M3, M4 ... gradually reach the intersection of the optimum duty condition line and the optimum heat interference condition line, namely, the point A shown in FIG. 28. A coordinate (Pb,Pp) of the point A shows the value of Pb and Pp which simultaneously optimizes the duty and the heat interference of the reproduced signal.

The following description will discuss the above operation based upon the flow chart shown in FIG. 29.

Pb is fixed to a certain value (s201). Pp is changed and is set to a certain value (s202). The first recording pattern, the second recording pattern and the third recording pattern are recorded to the magneto-optical disk 24 based upon the Pb and Pp (s203). A level of the reproduced signal of each pattern is detected (s204). A judgement is made as to whether or not the duty of the reproduced signal is optimum (s205). If the judgement is made that the duty is not optimum, the sequence returns to (s202), and while s202 through s205 are being repeated, the point D1 where the duty of the reproduced signal becomes optimum is determined. In the like manner, the point T1 where the heat interference becomes optimum is determined (s206). The midpoint M1 of D1 and T1 is calculated (s207). Pp is fixed to the value of Pp at M1 (s208). Pb is changed and is set to a certain value (s209). The first pattern, the second pattern and the third pattern are recorded to the magneto-optical disk 24 based upon the Pb and Pp (s210). The level of the reproduced signal of each pattern is detected (s211). A judgement is made as to whether or not the duty of the reproduced signal is optimum (s212). If the judgement is made that the duty is not optimum, the sequence returns to s209, and while s209 through s212 are being repeated, the point D2 where the duty of the reproduced signal becomes optimum is determined. In the like manner, the point T2 where the heat interference becomes optimum is determined (s213). The midpoint M2 of D2 and T2 is calculated (s214). The sequence returns to s201 again and Pb is fixed to the value of Pb at M2.

As this sequences are repeated, the midpoints M1, M2, M3, M4 ... gradually reach the intersection of the optimum duty condition line and the optimum heat interference condition line, thereby making it possible to determine the optimum value.

Here, the above-mentioned embodiment discussed the example that the recording variables are the two power values Pb and Pp, but they are not limited to this and in the like manner, the optimum value can be obtained even in the case where more than three variables are used. Furthermore, the recording variable is not limited to the recording power, so it may be a length and a width of the recording pulse (or an interval or a cycle of the pulse).

In addition, in the case where two recording variables are used, the intersection of two lines should be a point where both of the two relative relationships between the two lines is satisfied, but in the case where three variables are used, three straight lines are not necessarily crossed at one point. For this reason, if a point where an average distance from the three straight lines becomes shortest is the optimum point, the three relative relationships can be averagely satisfied. The same is true for the case where four and over variables are used.

Figure 11:
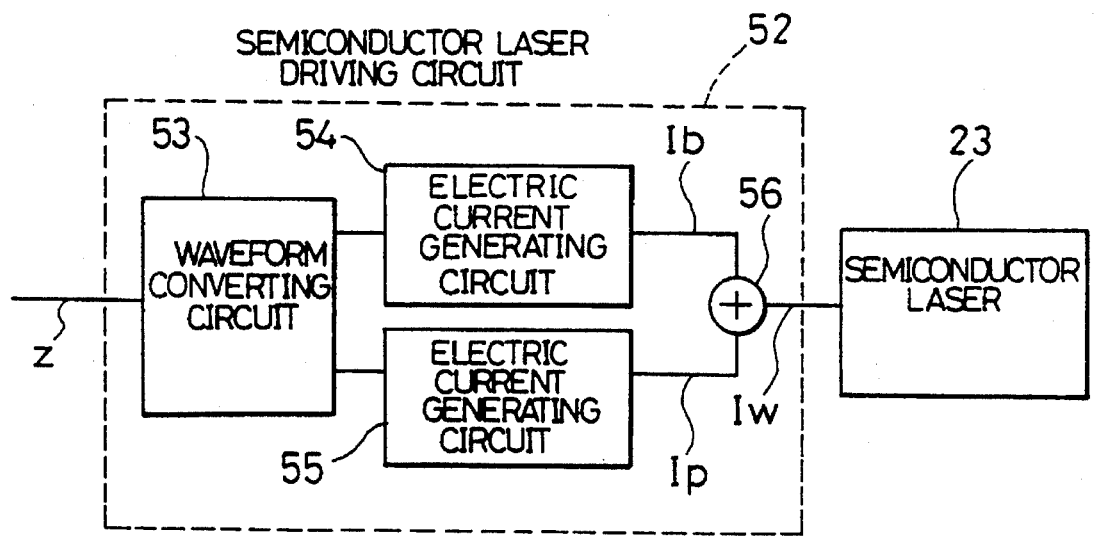
FIG. 11 is an explanatory drawing which shows an arrangement of a semiconductor laser driving circuit.

In addition, an example that the light powers Pb and Pp is optimized is illustrated, but not being limited to this, the same effect can be also given by optimizing the driving electric currents Ib and Ip of the semiconductor laser, because as shown in FIG. 11, the light powers Pb and Pp correspond to the driving electric currents Ib and Ip of the semiconductor laser in a ratio of one to one.

In the above embodiments, it is preferable that a recording area for the exclusive use of test-writing is provided in the magneto-optical disk 24 separately from an information recording area. When the recording condition is set by using the recording area for the exclusive use of test-writing, the possibility that information in the information recording area is broken is eliminated.

Here, in the present embodiment, as shown in FIG. 28, since M1, M2 ... are successively obtained, they can gradually reach the optimum point A. Therefore, the accuracy can be improved by increasing frequency of obtaining the midpoint.

TWELFTH EMBODIMENT

Figure 30:
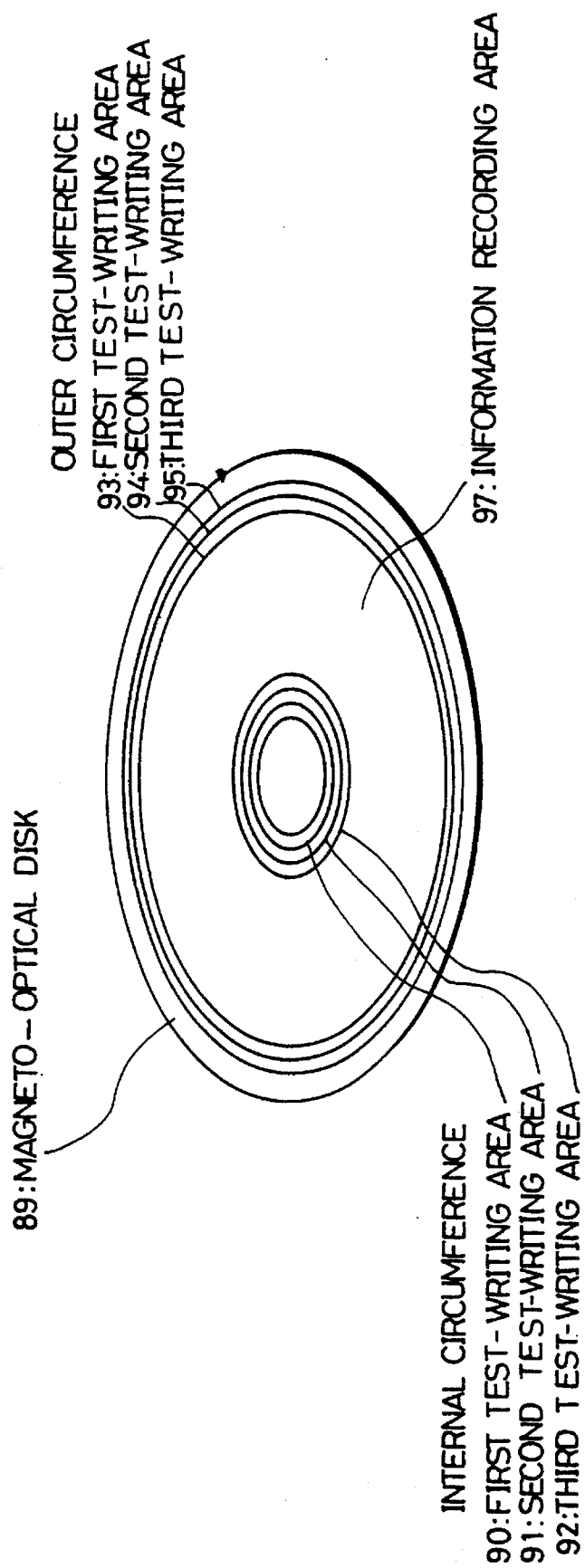
FIG. 30 is an explanatory drawing which shows an arrangement of an optical recording medium of the present invention.
Figure 31:
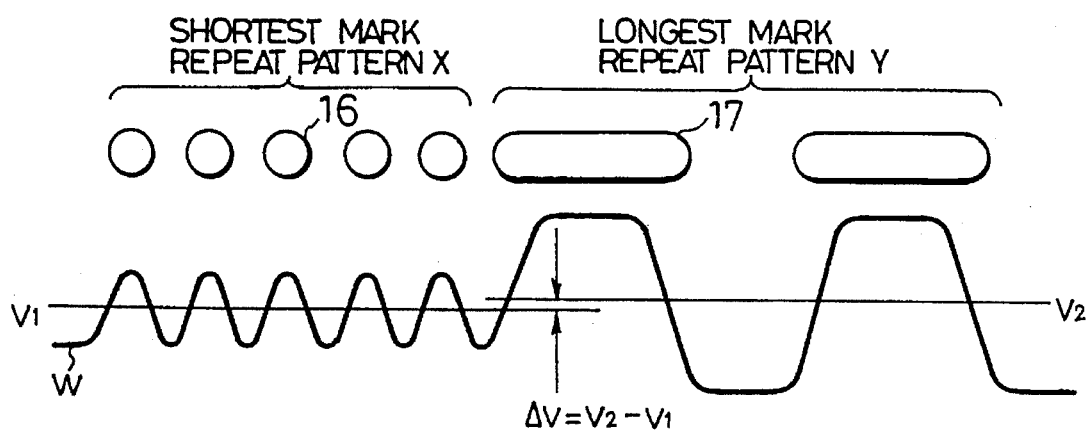
FIG. 31 is an explanatory drawing which shows a relationship between a recording pattern to be recorded by using a conventional test-writing recording control method and its reproduced signal.

The following description will discuss the twelfth embodiment of the present invention referring to FIG. 30. Here, for convenience of explanation, those members that have the same functions, and that are described in the aforementioned embodiments are indicated by the same reference numerals and the description thereof is omitted.

As described in each embodiment, the test-writing frequency per one optimization of a power is not only one but plural. Therefore, as time goes by, the accumulated test-writing frequency increases. The optimization of a plurality of power values, especially, requires more test-writing frequency, so the rewriting frequency reaches the guaranteed rewriting frequency. Therefore, a magneto-optical disk 89 shown in FIG. 30 has a first test-writing area 90, a second test-writing area 91 and a third test-writing area 92 by the track in its inner circumference. The track is formed so as to have a spiral or a concentric circle-like configuration. Its area is distinguished from an information recording area 97 so that recording of information other than the test-writing is prevented. The test-writing frequency can be dispersed to a plurality of areas by arranging a plurality of test-writing areas. As a result, it is possible to secure life. Here, a plurality of test-writing areas by the track do not have to be limited, for example, a plurality of test-writing area by the sector may be arranged. Furthermore, test-writing areas 93, 94 and 95 may be arranged in the outer circumference.

In each embodiment, the test-writing recording control apparatus and the test-writing recording control method of the present invention are explained illustrating the magneto-optical disk as the optical recording medium, but they do not limited to this. Therefore, the present invention is widely applicable to an optical recording medium or an information recording and reproduction apparatus, such as a phase-changing type optical disk, write once read many type optical disk, for recording information by means of a heat which is generated when a light beam is emitted.

In addition, the number of the repeat marks, the repeat non-marks, the isolated marks and the isolated non-marks in FIGS. 2, 8, 14, 21 and 22 does not have to be limited to the drawings, so it may be satisfactory as long as the number can ensure the detection of the heat interference or the duty of the reproduced signal regardless of a large or small number.

In the present embodiment, as the number of the test-writing areas in FIG. 30 increases, a detection error due to irregular sensitivity of the recording medium can be averaged more easily, thereby making it possible to determine an optimum power more accurately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A test-writing recording control method comprising:

a first step of recording a first recording test pattern and a second recording test pattern onto an optical recording medium by generating a light beam and applying it to said medium, said first recording test pattern consisting of a combination of a first microarea in a first magnetization direction state, which is one of a recording mark or a non-mark section, with a second microarea in a second magnetization direction state, which is the other of the recording mark or the non-mark section, and is shorter than a light beam diameter, said second recording test pattern consisting of a combination of a third microarea, in the first magnetization direction state, which is longer than said first microarea, with said second microarea;

a second step of detecting a respective peak level of reproduced signals corresponding to said first recording test pattern and to said second recording test pattern, so as to compare said signals; and a third step of setting a recording parameter, relating to emission of said light beam, based upon the result of the comparison in said second step.

2. The test-writing recording control method as defined in claim 1, wherein:

said first recording pattern is a repeat mark pattern obtained by alternating said second microareas as the recording mark and said first microareas as the non-mark section which are formed so as to have an approximately same length as said second microareas, said second recording pattern is an isolated mark pattern obtained by alternating the second microareas as the recording mark and third microareas as the non-mark which are formed longer than said first microarea so that said second microareas are not interfered with each other by a heat.

3. The test-writing recording control method as defined in claim 1, wherein:

said first recording pattern is a repeat non-mark pattern obtained by alternating the second microareas as the non-mark section and first microareas as the recording mark which are formed so as to have an approximately same length as the second microareas, said second recording pattern is an isolated non-mark pattern obtained by alternating said second microareas as the non-mark section and third microareas as the recording mark which are formed longer than the first microareas so that the third microareas are interfered with one another by a heat with the second microarea positioned between the third microareas.

4. The test-writing recording control method as defined in claim 1, wherein said level is a peak level of the reproduced signal corresponding to the second microareas of each pattern and the recording condition is set in said third step so that a difference between the peak levels becomes minimum.

5. The test-writing recording control method as defined in claim 1, wherein said level is a bottom level of the reproduced signal corresponding to the second microareas of each pattern and the recording condition is set in said third step so that a difference between the bottom levels becomes minimum.

6. The test-writing recording control method as defined in claim 1, wherein said level is an average level of the reproduced signal corresponding to each recording pattern and the recording condition is set in said third step so that a difference between the average levels becomes minimum.

7. The test-writing recording control method as defined in claim 1, wherein said recording mark and non-mark section are formed by magneto-optical recording and have perpendicular anisotropy which is different from each other.

8. The test-writing recording control method as defined in claim 1, further comprising the steps of:

generating a recording pulse which modulates intensity of the light beam prior to said first step;

carrying out said second step the number of times which is equal to and above the number of variables for determining the recording pulse so as to obtain relative relationships between the variables based upon the same number of viewpoints as the number of times; and obtaining an answer to the variables which satisfies all the relative relationships so as to generate a new recording pulse based upon the answer.

9. A test-writing recording control method comprising:

a first step of generating a recording pulse which modulates intensity of a light beam so as to record information, onto an optical recording medium, by emitting a light beam, whose parameters are specified by the recording pulse;

a second step of checking a result of reproduction of information recorded in said first step from a viewpoint of the number which is equal to or above the number of parameters, selected from the group consisting of power value for bias (Pb), power value for pulse (Pp), pulse width, pulse length, and pulse interval, which parameters specify the recording pulse, so as to obtain equations which express any interdependence between said parameters; and a third step of calculating a set of values of said parameters which satisfies all the equations so as to generate a new recording pulse, based upon the calculated set of values.

10. The test-writing recording control method as defined in claim 9, wherein:

said plurality of variables are a first variable and a second variable, said relative relationships respectively satisfy a first condition, which is one of a condition that a duty factor of a reproduced signal becomes optimum and a condition that heat interference becomes optimum, and a second condition which is the other of them.

11. The test-writing recording control method as defined in claim 10, further comprising a step of setting an initial value to the first variable and the second variable prior to said first step.

12. The test-writing recording control method as defined in claim 11, wherein said third step includes the steps of:

gradually increasing the first variable and the second variable so that said first condition is satisfied in a range where the first variable and the second variable do not exceed a predetermined maximum value; and gradually increasing the first variable and the seconds variable so that said second condition is satisfied in a range where the first variable and the second variable do not exceed the maximum value.

13. The test-writing recording control method as defined in claim 10, wherein:

said second step includes a fourth step of while fixing a value of either the first variable or the second variable to a certain value and changing a value of the other variable of either the first variable or the second variable, storing the values at the time when the first condition and the second condition are respectively satisfied as a first and a second values, said third step includes a fifth step of calculating an average value of the first value and the second value.

14. The test-writing recording control method as defined in claim 13, wherein:

said fourth step and the fifth step are alternatively repeated, the certain value in said fourth step is the average value, which is calculated in said fifth step prior to said fourth step.

15. The test-writing recording control method as defined in claim 10, wherein:

said second step includes a fourth step of detecting two combinations of the first variable and the second variable which satisfy said first condition, a fifth step of obtaining a first equation, which is satisfied by the two combinations of the first variable and the second variable detected in the fourth step, a sixth step of detecting two combinations of the first variable and the second variable so that said two combinations of the first and second variable are satisfied by said second condition, and a seventh step of obtaining a second equation, which is satisfied by both the combinations of the first variable and the second variable detected in the sixth step, said third step includes a step of making simultaneous equations with said first equation and said second equation so as to obtain its answer.

16. The test-writing recording control method as defined in claim 15, wherein:

said fourth step includes the steps of:

fixing a value of the first variable to a certain value; and changing a value of the second variable until said first condition is satisfied, said sixth step includes the steps of:

fixing a value of the first variable to a certain value; and changing a value of the second variable until said second condition is satisfied.

17. A test-writing recording control apparatus, comprising:

recording means for forming a first recording test pattern and a second recording test pattern onto an optical recording medium by emitting a light beam, said first recording test pattern consisting of a combination of a first microarea in a first magnetization direction state which is one of a recording mark or a non-mark section and a second microarea, in a second magnetization direction state, which is the other of the recording mark or the non-mark section, and is shorter than a light beam diameter, said second recording test pattern consisting of a combination of a third microarea in the first state, which is longer than the first microarea, and the second microarea;

first level-detection means, for detecting a peak level from a reproduced signal corresponding to said first recording test pattern;

second level-detection means for detecting a peak level from a reproduced signal corresponding to said second recording test pattern;

comparison means, calculating a difference between the level detected by said first level-detection means and the level detected by said second level-detection means; and optimum value determining means, which sets a recording parameter, relating to emission of said light beam, in a way which minimizes said difference between said detected levels.

18. The test-writing recording control apparatus as defined in claim 17, wherein:

said first level detection means includes envelope detection means for detecting a peak level of the reproduced signal corresponding to the first recording pattern, said second level detection means includes envelope detection means for detecting a peak level of the reproduced signal corresponding to the second recording pattern.

19. The test-writing recording control apparatus as defined in claim 17, wherein said comparison means is a subtracter.

20. The test-writing recording control apparatus as defined in claim 17, wherein:

said first level detection means is averaging means for detecting an average level of the reproduced signal corresponding to the first recording pattern, said second level detection means is averaging means for detecting an average level of the reproduced signal corresponding to the second recording pattern.

21. The test-writing recording control apparatus as defined in claim 17, wherein:

said first level detection means and said second level detection means includes:

timing generating means for generating a timing signal per peak of the reproduced signal; and an analog/digital converter for converting the reproduced signal to a digital signal in accordance with the timing signal so as to take out the peak level of the reproduced signal, said comparison means and said optimum value determining means includes a processor for calculating a level difference between the peak levels so as to set the recording condition so that the level difference becomes minimum.

22. The test-writing recording control apparatus as defined in claim 17, further comprising:

modulation means, which modulates intensity of the light beam, for generating a recording pulse;

relative relationship determining means for obtaining relative relationships between a plurality of variables which determine the recording pulse; and optimizing means for obtaining respective absolute values of said plurality of variables from the relative relationships.

23. A test-writing recording control apparatus, comprising:

recording means for generating a recording pulse which modulates intensity of a light beam so as to form a recording pattern on an optical recording medium by emitting a light beam in accordance with the recording pulse;

relative relationship determining means for obtaining equations expressing any interdependence among the variables or parameters which determine the recording pulse; and optimizing means for obtaining respective absolute values of said plurality of variables from the equations.

24. The test-writing recording control apparatus as defined in claim 23, wherein said relative relationship determining means includes:

duty condition determining means for obtaining the relative relationships between said plurality of variables which satisfy a condition where a duty factor of the reproduced signal of the recording pattern becomes optimum;

heat interference condition determining means for obtaining the relative relationship between the variables which satisfy a condition where heat interference becomes optimum.

25. The test-writing recording control apparatus as defined in claim 24, wherein said duty condition determining means includes -pattern generating means for generating the recording pulse which modulates the intensity of the light beam so that said recording means forms three kinds of recording patterns composed of a combination of a second microarea and a first microarea or a third microarea on the optical recording medium, said first microarea in a first state being one of a recording mark or a non-mark section, said second microarea in a second state being the other of the recording mark or the non-mark section and being shorter than a light beam diameter, said third microarea in the first state being longer than said first microarea.

26. The test-writing recording control apparatus as defined in claim 25, wherein when said three kinds of recording patterns are respectively called a first recording pattern, a second recording pattern and a third recording pattern, said duty condition determining means further includes:

first level detection means for detecting a bottom level of a reproduced signal corresponding to the first recording pattern;

second level detection means for detecting a peak level of a reproduced signal corresponding to the second recording pattern;

third level detection means for detecting a bottom level of a reproduced signal corresponding to the second recording pattern;

fourth level detection means for detecting a peak level of a reproduced signal corresponding to the third recording pattern;

first comparison means for comparing an output of said first level detection means with an output of said third level detection means;

second comparison means for comparing an output of said second level detection means with an output of said fourth level detection means; and third comparison means for comparing the output of said first comparison means with the output of said second comparison means.

27. The test-writing recording control apparatus as defined in claim 24, wherein said heat interference condition determining means includes pattern generating means for generating the recording pulse which modulates the intensity of the light beam on said modulating means so that three kinds of recording patterns, composed of a combination of a second microarea and a first microarea or a third microarea, are formed on the optical recording medium, said first microarea in a first magnetization direction state being one of a recording mark or a non-mark section, said second microarea in a second magnetization direction state being the other of the recording mark or the non-mark section and being shorter than a light beam diameter, said third microarea in the first magnetization direction state being longer than said first microarea.

28. The test-writing recording control apparatus as defined in claim 27, wherein when said three kinds of recording patterns are called a first recording pattern, a second recording pattern and a third recording pattern, said heat interference condition determining means further includes:

first level detection means for detecting a peak level of a reproduced signal corresponding to the first recording pattern;

second level detecting means for detecting a peak level of a reproduced signal corresponding to the second recording pattern;

third level detecting means for detecting a bottom level of a reproduced signal corresponding to the second recording pattern;

fourth level detecting means for detecting a bottom level of a reproduced signal corresponding to the third recording pattern; and first comparison means for making at least either a comparison of an output of said first level detection means with an output of said second level detection means or a comparison of an output of said third level detection means with an output of said fourth level detection means.

29. The test-writing recording control apparatus as defined in claim 28, further comprising second comparison means for comparing a difference between the output of said first level detection means and the output of said second level detection means with a difference between the output of said third level detection means and the output of said fourth level detection means.

30. The test-writing recording control apparatus as defined in claim 23, wherein said plurality of variables are two variables which show a power of the light beam.

31. The test-writing recording control apparatus as defined in claim 23, wherein said plurality of variables are two variables which show driving current which drives a light source where the light beam is emitted.

32. The test-writing recording control apparatus as defined in claim 23, wherein:

said relative relationship determining means includes simultaneous equations determining means for obtaining simultaneous equations consisting of equations whose number is equal to and above the number of variables, said optimizing means includes calculating means for obtaining an answer to the simultaneous equations.

* * * * *